US010666882B2

(12) United States Patent
Takane

(10) Patent No.: US 10,666,882 B2
(45) Date of Patent: May 26, 2020

(54) SOLID-STATE IMAGING DEVICE, METHOD FOR DRIVING SOLID-STATE IMAGING DEVICE, AND ELECTRONIC APPARATUS

(71) Applicant: Brillnics Japan Inc., Tokyo (JP)

(72) Inventor: Yasuo Takane, Tokyo (JP)

(73) Assignee: Brillnics Japan Inc., Tokyo (JP)

(*) Notice: Subject to any disclaimer, the term of this patent is extended or adjusted under 35 U.S.C. 154(b) by 39 days.

(21) Appl. No.: 16/065,847

(22) PCT Filed: Dec. 26, 2016

(86) PCT No.: PCT/JP2016/088655
§ 371 (c)(1),
(2) Date: Jun. 25, 2018

(87) PCT Pub. No.: WO2017/115744
PCT Pub. Date: Jul. 6, 2017

(65) Prior Publication Data
US 2019/0014277 A1 Jan. 10, 2019

(30) Foreign Application Priority Data
Dec. 28, 2015 (JP) ................................ 2015-256883

(51) Int. Cl.
*H04N 5/355* (2011.01)
*H04N 5/3745* (2011.01)
(Continued)

(52) U.S. Cl.
CPC ..... *H04N 5/35536* (2013.01); *H04N 5/35581* (2013.01); *H04N 5/374* (2013.01);
(Continued)

(58) Field of Classification Search
CPC .... H04N 5/35536; H04N 5/378; H04N 5/374; H04N 5/35581; H04N 5/37452; H04N 9/07; H04N 9/0451; H04N 9/04557
See application file for complete search history.

(56) References Cited

U.S. PATENT DOCUMENTS

2007/0013797 A1* 1/2007 McKee ................ H04N 5/3559
348/308
2009/0257672 A1* 10/2009 Sullender ............... H04N 5/217
382/260
(Continued)

FOREIGN PATENT DOCUMENTS

JP 3592106 B2 11/2004
JP 3984814 B2 10/2007
(Continued)

OTHER PUBLICATIONS

International Search Report dated Mar. 14, 2017, issued in counterpart International Application No. PCT/JP2016/088655 (2 pages).

*Primary Examiner* — Lin Ye
*Assistant Examiner* — John H Morehead, III
(74) *Attorney, Agent, or Firm* — Westerman, Hattori, Daniels & Adrian, LLP

(57) ABSTRACT

A solid-state imaging device 10 includes a signal processing part 710 which, when combining specific read-out signals among the plurality of read-out signals, selects at least one signal which becomes necessary for a combinational operation in accordance with a result of a comparison between at least one read-out signal among the plurality of read-out signals and a threshold value, applies the selected signal to the combinational processing, and generates a combined signal extended in dynamic range, and wherein the signal processing part, when combining read-out signals from one specific pixel, determines the combinational information concerning the combinational operation of these read-out signals with reference to the combinational information concerning the combinational operation of the surrounding pixels of the one specific pixel. By this configuration, it is possible to smoothly switch a plurality of signals, possible (Continued)

to realize a higher dynamic range and a higher quality of image.

13 Claims, 21 Drawing Sheets

(51) Int. Cl.
*H04N 5/374* (2011.01)
*H04N 5/378* (2011.01)
*H04N 9/04* (2006.01)
*H04N 9/07* (2006.01)

(52) U.S. Cl.
CPC ......... *H04N 5/378* (2013.01); *H04N 5/37452* (2013.01); *H04N 9/0451* (2018.08); *H04N 9/04557* (2018.08); *H04N 9/07* (2013.01)

(56) References Cited

U.S. PATENT DOCUMENTS

| | | | | |
|---|---|---|---|---|
| 2011/0211732 | A1* | 9/2011 | Rapaport | G06F 3/1454 382/107 |
| 2012/0002082 | A1* | 1/2012 | Johnson | G06T 5/50 348/234 |
| 2013/0135504 | A1 | 5/2013 | Nakata | |
| 2013/0242152 | A1* | 9/2013 | Kasai | H04N 5/2353 348/294 |
| 2013/0322753 | A1* | 12/2013 | Lim | G06T 5/001 382/167 |
| 2014/0168474 | A1* | 6/2014 | Geiss | A61B 5/0084 348/239 |
| 2014/0267828 | A1* | 9/2014 | Kasai | H04N 9/045 348/229.1 |
| 2015/0312489 | A1* | 10/2015 | Hoelter | H04N 5/33 348/164 |
| 2015/0319412 | A1* | 11/2015 | Koshiba | H04N 5/367 348/246 |

FOREIGN PATENT DOCUMENTS

| | | |
|---|---|---|
| JP | 2013-115470 A | 6/2013 |
| JP | 2014-30073 A | 2/2014 |
| JP | 2014-93037 A | 5/2014 |
| JP | 2015-185917 A | 10/2015 |
| WO | 2014/020970 A1 | 2/2014 |

* cited by examiner

FIG. 3(A)

| | UNT |
|---|---|
| HCG G/B=1.5 | |
| R 2200 | Gr 2400 |
| Gb 2400 | B 1600 |

PXL-R, PXL-Gr, PXL-Gb, PXL-B

FIG. 3(B)

| | UNT |
|---|---|
| LCG G/B=2 | |
| R 80 (1280) | Gr 100 (1600) |
| Gb 100 (1600) | B 50 (800) |

PXL-Gr, PXL-R, PXL-B, PXL-Gb

SOLID-STATE IMAGING DEVICE, METHOD FOR DRIVING SOLID-STATE IMAGING DEVICE, AND ELECTRONIC APPARATUS

TECHNICAL FIELD

The present invention relates to a solid-state imaging device, a method for driving a solid-state imaging device, and an electronic apparatus.

BACKGROUND ART

As solid-state imaging devices (image sensors) using photoelectric conversion elements detecting light and generating a charge, CMOS (complementary metal oxide semiconductor) image sensors have been put into practical use. CMOS image sensors have been widely applied as parts of digital cameras, video cameras, monitoring cameras, medical endoscopes, personal computers (PC), mobile phones and other portable terminals (mobile devices) and other various types of electronic apparatuses.

A CMOS image sensor, for each pixel, has an FD amplifier having a photodiode (photoelectric conversion element) and a floating diffusion layer (FD) layer. The mainstream of reading operations for the same is a column parallel output type selecting a certain row in a pixel array and simultaneously reading the pixels in a column direction.

In this regard, for improvement of characteristics, various methods for realizing solid-state imaging devices (CMOS image sensors) of a high quality of image having a high dynamic range (HDR) have been proposed.

Conventionally, in a solid-state imaging device, as a method for raising (extending) the dynamic range, for example, there are known a method of reading two types of signals having different storage times from the same pixel in the image sensor and combining these two types of signals to extend the dynamic range, a method of combining a signal of a pixel having a high sensitivity which has a small dynamic range and a signal of a low sensitivity which is extended in the dynamic range to thereby extend the dynamic range, and other methods.

For example, PTL1 discloses a technique for raising the dynamic range by dividing exposure into two or more steps of an image capture corresponding to a high luminance side by a short exposure time and an image capture corresponding to a low luminance side by a long exposure time. Further, PTL 1 discloses a technique for raising the dynamic range by making the capacity of the floating diffusion variable.

Further, PTL 2 discloses a technique for raising the dynamic range by connecting a floating diffusion of a small capacity C1 on a high sensitivity and low luminance side and a floating diffusion of a large capacity C2 on a low sensitivity and high luminance side to a photodiode PD and individually outputting an output OUT1 on the low luminance side and an output OUT2 on the high luminance side.

As the method of combining these signals, in terms of time, there is a system covering a plurality of frames, a system outputting two or more types of signals having different dynamic ranges in one frame, and the like.

CITATION LIST

Patent Literature

PTL 1: Japanese Patent No. 3984814
PTL 2: Japanese Patent No. 3592106

SUMMARY OF INVENTION

Technical Problem

In this regard, in each of these methods, it is necessary to keep the plurality of signals to be assembled together (combined) almost equal in linearity of output voltages with respect to quantities of incident light (luminance) in the vicinity of the signal values which are combined (switching of signals). In order to extend the dynamic ranges (D ranges), the signals are designed so that their gains with respect to the quantities of light (luminances) are different, therefore mainly the gains are corrected in a digital signal processor after digital conversion in an analog-to-digital converter (ADC), so that their linearities (or inclinations) are kept the same.

However, there are variations among individual units of solid-state imaging devices and variations among pixels in single units. Therefore, even if the signals are switched by a numerical values corrected based on the parameter of the center value of the variation, sometimes the linearity in the vicinity of that level is not always guaranteed. When the precision of correction is low (varies) in this way, smooth switching becomes impossible, therefore discontinuous points are formed becoming noise, resulting in the disadvantage of causing so-called "tone jump" or other deterioration of the image.

The present invention provides a solid-state imaging device enable of smoothly switching a plurality of signals to be combined irrespective of individual variations and the like, capable of realizing a higher dynamic range while suppressing generation of false colors or other deterioration of images, and consequently capable of realizing a higher image quality, a method for driving a solid-state imaging device, and an electronic apparatus.

Solution to Problem

A first aspect of the present invention is a solid-state imaging device capable of extending a dynamic range by combining a plurality of read-out signals, having a signal processing part which, when combining specific read-out signals among the plurality of read-out signals, selects at least one signal which becomes necessary for a combinational operation in accordance with a result of a comparison between at least one read-out signal among the plurality of read-out signals and a threshold value, applies the selected signal to combinational processing, and generates a combined signal extended in dynamic range, wherein the signal processing part, when combining read-out signals from one specific pixel, determines combinational information concerning the combinational operation of these read-out signals with reference to the combinational information concerning the combinational operation of surrounding pixels of the one specific pixel.

A second aspect of the present invention is a method for driving a solid-state imaging device capable of extending a dynamic range by combining a plurality of read-out signals, comprising a comparison process of, when combining specific read-out signals among the plurality of read-out signals, comparing at least one read-out signal among the plurality of read-out signals and a threshold value, a selection process of selecting at least one signal which becomes necessary for a combinational operation in accordance with the result of comparison, and a generation process of applying the selected signal to the combinational processing and generating a combined signal extended in dynamic range, wherein, when combining read-out signals from one specific pixel, the combinational information concerning the combinational operation of these read-out signals is determined with reference to the combinational information concerning the combinational operation of the surrounding pixels of the one specific pixel.

An electronic apparatus of a third viewpoint of the present invention has a solid-state imaging device capable of extending a dynamic range by combining a plurality of read-out signals and an optical system of forming a subject image in the solid-state imaging device, wherein the solid-state imaging device includes a signal processing part which, when combining specific read-out signals among the plurality of read-out signals, selects at least one signal which becomes necessary for a combinational operation in accordance with a result of a comparison between at least one read-out signal among the plurality of read-out signals and a threshold value, applies the selected signal to the combinational processing, and generates a combined signal extended in dynamic range, and wherein the signal processing part, when combining read-out signals from one specific pixel, determines the combinational information concerning the combinational operation of these read-out signals with reference to the combinational information concerning the combinational operation of the surrounding pixels of the one specific pixel.

ADVANTAGEOUS EFFECTS OF INVENTION

According to the present invention, it is possible to smoothly switch a plurality of signals to be combined irrespective of variations in individual units etc., possible to realize a higher dynamic range while suppressing generation of false colors or other deterioration of images, and consequently possible to realize a higher quality of image.

BRIEF DESCRIPTION OF DRAWINGS

FIG. 3(A) and FIG. 3(B) are a view showing an example of a high conversion gain signal and a low conversion gain signal in a Bayer array with the additional of output code values.

FIG. 5 is a view for explaining an example in which a plurality of pixels having the same color as a specific pixel are employed as the surrounding pixels of a specific B pixel and in which their combinational information are referred to.

REFERENCE SIGNS LIST

10 . . . solid-state imaging device, 20 . . . register controller, 30 . . . timing controller, 40 . . . pixel array part, 50 . . . analog gain part, 60 . . . analog-to-digital converter (ADC), 70 . . . digital signal processor (DSP), 710, 710A . . . signal processing parts, 711 . . . combinational information judging part, 712, 713 . . . multipliers, 714, 714A . . . combinational processing parts, 715 . . . random number generating part, 80 . . . scalable low voltage signaling (SLVS) interface part, 90 . . . clock generator, 100 . . . electronic apparatus, 110 . . . CMOS image sensor, 120 . . . optical system, and 130 . . . signal processing circuit (PRC).

Description of Embodiments

Below, embodiments of the present invention will be explained with reference to the drawings.

First Embodiment

Figure 1:
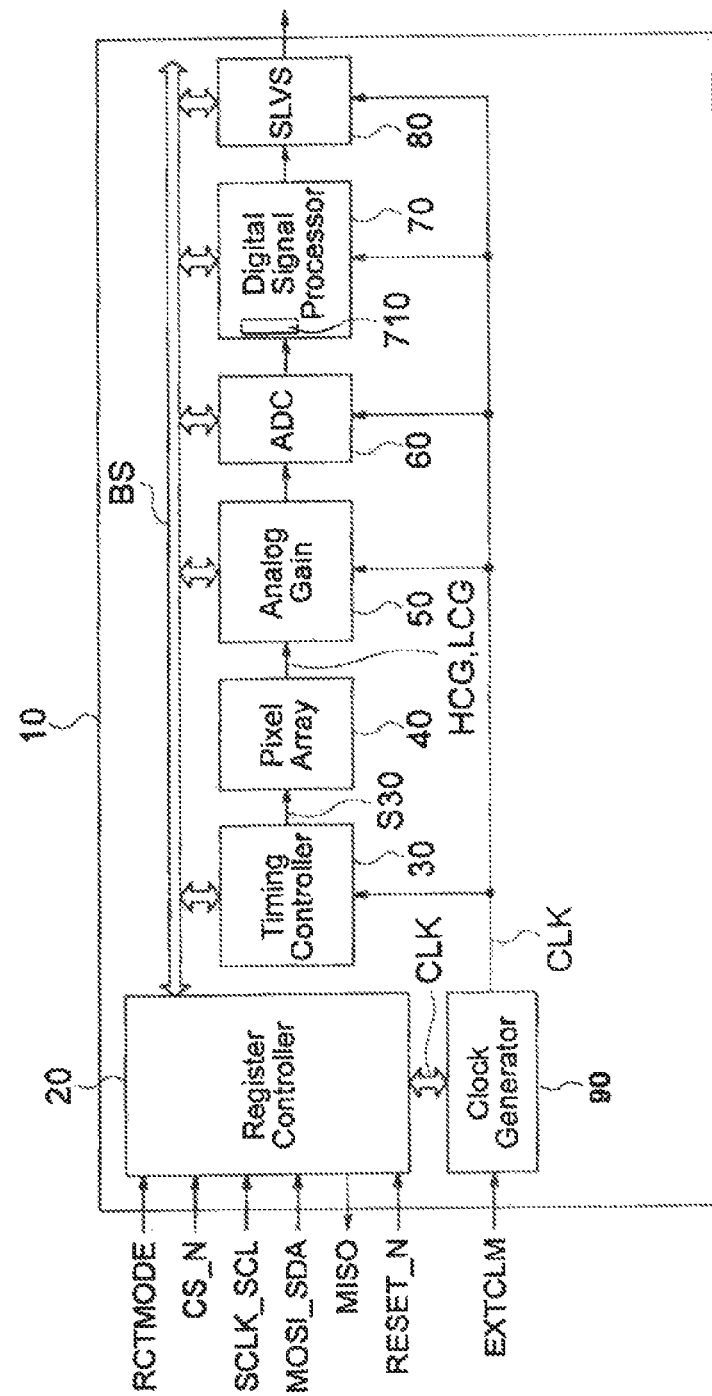
FIG. 1 is a block diagram showing an example of an overall configuration of a signal processing system in a solid-state imaging device according to a first embodiment of the present invention.

FIG. 1 is a block diagram showing an example of an overall configuration of a signal processing system, in a solid-state imaging device according to a first embodiment of the present invention. In the present embodiment, a solid-state imaging device 10 is configured so that it can extend a dynamic range by combining a plurality of (two or three or more) read-out signals read out from pixels and is configured by for example a CMOS image sensor.

The solid-state imaging device 10 in FIG. 1, as principal components, has a register controller 20, timing controller 30, pixel array part 40, analog gain part 50, analog-to-digital converter (ADC) part 60, digital signal processor (DSP) 70 including a function as a signal processing part, scalable low voltage signal transmission (SLVS) interface part 80, and clock generator 90.

In the solid-state imaging device 10, the register controller 20, timing controller 30, analog gain part 50, ADC part 60, DSP part 70, and SLVS interface part 80 are connected by a bus BS for transmitting and receiving the signals. Further, the system clock CLK generated by the clock generator 90 is supplied to the register controller 20, timing controller 30, analog gain part 50, ADC part 60, ESP part 70, and SLVS interface part 80.

The register controller 20 communicates with a not shown CPU, DSP, or other external control device and functions as a memory part in which operation modes are set and various types of control parameters are written.

The timing controller 30 generates a control pulse S30 for reading out the pixel data matching with various operation modes and performs readout control of the pixel array part 40.

In the pixel array part 40, a plurality of pixels each including a photodiode (photoelectric conversion element) and inter-pixel amplifier are arranged in a two-dimensional matrix comprised of N rows and M columns. In the pixel array part 40, as the pixel arrangement, for example, a Bayer array as shown in FIG. 2 is employed.

Figure 2:
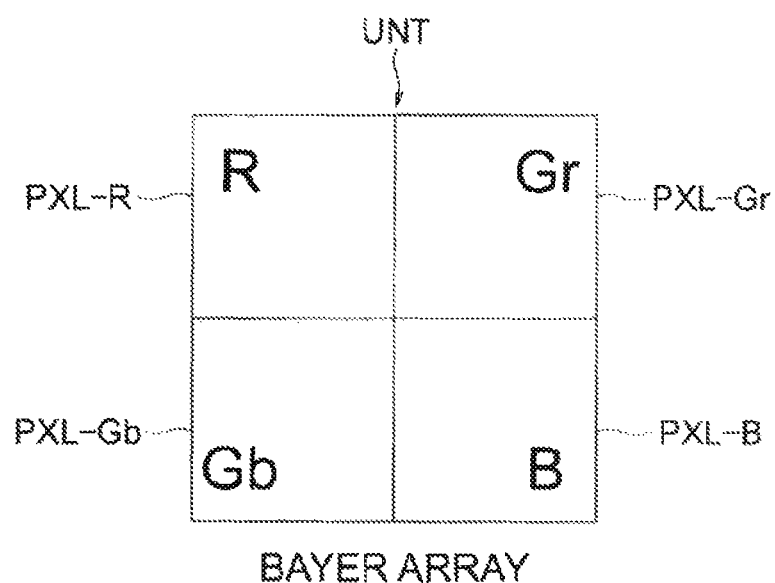
FIG. 2 is a view showing a Bayer array as an example of arrangement of pixels.

FIG. 2 shows an example of the smallest unit of a Bayer array. In this example, an R (red) pixel PXL-R, Gr (green) pixel PXL-Gr, Gb (green) pixel PXL-Gb, and B (blue) pixel PXL-B are arranged in a 2×2 matrix whereby the smallest unit UNT of a Bayer array is formed.

According to the control pulse S30 from the timing controller 30, the read-out signals read out from a group of pixels including photoelectric conversion elements in the pixel array part 40 are amplified with predetermined gains in the analog gain part 50, converted to digital signals in the ADC part 60, and input to the DSP part 70 functioning as the signal processing part as will be explained in detail later. Note that, for example, a column memory is arranged in an output stage of the ADC part 60.

In the DSP part 70, correlated double sailing (CDS), black correction, digital gain, and other image signal processing are applied to the input digital signals, then the results are output while adapted to the output type (SLVS in FIG. 1) in the SLVS interface part 80.

In the present embodiment, as the read-out signals read out from the group of pixels including photoelectric conversion elements in the pixel array part 40, as shown in FIG. 1, two or more types (two types in the present example) of signals having different photoelectric conversion gains such as signals of the two systems of a high conversion gain signal (HCG; high conversion gain) and a low conversion gain signal (LCG; low conversion gain) are read out. Further, the two signals are combined in the signal processing part 710 in the DSP part 70 to thereby generate a high dynamic range signal extended in dynamic range.

Note that, there are two systems of the read-out signals. However, as will be explained later, it is possible to process them in a time division manner by setting a portion concerning reading of a signal (for example signal line) as one system.

The high conversion gain signal HCG is a high gain output signal from the photoelectric conversion element part. However, it becomes saturated by a smaller quantity of incident light in comparison with the low conversion gain signal LCG by that amount. The low conversion gain signal LCG is a low gain output signal, therefore has enough of a margin before the quantity of incident light which reaches saturation, so is larger in comparison with the high conversion gain signal HCG. Therefore, in the signal processing part 710 in the DSP part 70, by making the inclinations of the low conversion gain signal LCG and the high conversion gain signal HCG equal and, at the same time, by combining these two types of signals before the saturation of the high conversion gain signal HCG, that is, in an area where the linearity is maintained (nonsaturation area), a combined signal of a signal raised in dynamic range is acquired.

FIGS. 3(A) and 3 (B) axe views stewing an example of the high conversion gain signal HCG and low conversion gain signal LCG in a Bayer array with the addition of output code values. FIG. 3 (A) shows an example of the high conversion gain signal HCG, and FIG. 3 (B) shows an example of the low conversion gain signal LCG.

Basically, all of four pixels, i.e., the R pixel PXL-R, G pixel PXL-Gr, G pixel PXL-Gb, and B pixel PXL-B, which form the smallest unit UNT of the Bayer array have output code values relating to the high conversion gain signal HCG or low conversion gain signal LCG.

In the case of the high conversion gain signal HCG shown in FIG. 3 (A), the output code value of the R pixel PXL-R is "2200", the output code values of the G pixels PXL-Gr and PXL-Gb are "2400", and the output code value of the B pixel PXL-B is "1600". In the example of the high conversion gain signal BOG in FIG. 3 (A), the ratio (G/B) between the output code values of the G pixels PXL-Gr and PXL-Gb and the output code value of the B pixel PXL-B is 1.5.

On the other hand, in the case of the low conversion gain signal LCG shown in FIG. 3(B), the output code value of the R pixel PXL-R is "80", the output code values of the G pixels PXL-Gr and PXL-Gb are "100", and the output code value of the B pixel PXL-B is "50". In the example of the low conversion gain signal LCG in FIG. 3(B), the ratio (G/B) between the output code values of the G pixels PXL-Gr and PXL-Gb and the output code value of the B pixel PXL-B is 2.0.

Further, the ratio (HCG/LCG) between the high conversion gain signal HCG and the low conversion gain signal LCG is 24 in the R pixel PXL-R and G pixels PXL-Gr and PXL-Gb and is 32 in the B pixel PXL-B.

The signal processing part 710 in the DSP part 70 performing the combinational processing of the high conversion gain signal HCG and low conversion gain signal LCG multiplies the low conversion gain signal LCG which is input by a gain ratio K (=HCG/LCG) in order to make the inclination of the low conversion gain signal LCG having linearity before saturation equal to the inclination of the high conversion gain signal HCG which has linearity before saturation in the same way. In the example in FIG. 3(A) and FIG. 3(B), the gain ratio K is for example set to 16.

However, the gain ratio is not limited to 16 and is set to 4 or 8 etc. or another value in accordance with the situation.

In the example in FIG. 3(A) and FIG. 3(B), when multiplying the low conversion gain signal LCG by the gain ratio K=16 (=HCG/LCG), the output code value of the R pixel PXL-R becomes "80×16=1280", the output code value of each of the G pixels PXL-Gr and PXL-Gb becomes "100×16=1600", and the output code value of the B pixel PXL-B becomes "50×16=800".

The signal processing part 710 in the DSP part 70 performing the combinational processing of these high conversion gain signal HCG and low conversion gain signal LCG basically has the characteristic configuration and function which will be shown below. The concrete combinational processing will be explained in detail later.

The signal processing part 710 in the present embodiment is configured so that it can extend the dynamic range by combining a plurality of read-out signals (in this example, the high conversion gain signal HCG and low conversion gain signal LCG). The signal processing part 710 makes the inclinations of the plurality of read-out signals to be combined, for example, the high conversion gain signal HCG and low conversion gain signal LCG, equal. When combining the specific read-out signals among the plurality of read-out signals, the signal processing part 710 selects at least one signal which becomes necessary for the combinational operation in accordance with a result of a comparison between at least one read-out signal among the plurality of read-out signals (high conversion gain signal HCG and low conversion gain signal LCG) and a threshold value (Joint Thresh), applies the selected signal to the combinational processing, and generates a combined signal extended in dynamic range.

Further, the signal processing part 710 in the present embodiment, which improves the dynamic range by containing (assembling) a plurality of signals (high conversion gain signal HCG and low conversion gain signal LCG), has the following characteristic configuration in order to alleviate the problems due to the deterioration of the precision of the linearity occurring in combinational processing, in particular, in order to suppress the false color generated due to the change of the correlation with the surrounding pixels (pixels in the surrounding) caused by the change of the color temperature and to improve the quality of the image.

The signal processing part 710, when combining the read-out signals from one specific pixel, determines the combinational information concerning the combinational operation of the read-out signals with reference to the combinational information concerning he combinational operation of the surrounding pixels of one pixel.

Here, the combinational information concerning the combinational operation of the read-out signals contains for example information indicating whether a signal read out from a pixel is a high conversion gain signal HCG or low conversion gain LCG. However, the combinational information concerning the combinational operation of the read-out signals is not limited to information indicating whether a signal is a high conversion gain signal HCG or low conversion gain signal LCG.

The signal processing part 710, as the combinational information of the surrounding pixels of a specific pixel, refers to the combinational information of pixels forming the smallest unit UNT of the predetermined color arrangement (Bayer array in the present example) (information indicating whether a signal is a high conversion gain signal HCG or low conversion gain signal LCG in the present example).

Figure 4:
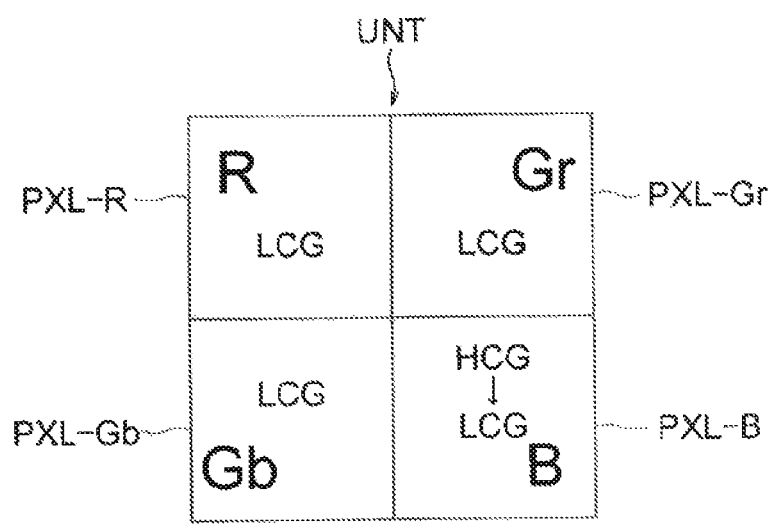
FIG. 4 is a view for explaining an example of referring to information showing, as combinational information of surrounding pixels of a specific pixel, combinational information of pixels forming a smallest unit of the Bayer array, that is, whether the signal is a high conversion gain signal or low conversion gain signal.

FIG. 4 is a view for explaining an example in which, as the combinational information of the surrounding pixels of a specific pixel, combinational information of the pixels forming the smallest unit UNT of the Bayer array, that is, information indicating whether a signal is a high conversion gain signal HCG or low conversion gain signal LCG, is referred to.

In the example shown in FIG. 4, the specific pixel is the B pixel PXL-B of the smallest unit UNT of the Bayer array, while the surrounding pixels are the R pixel PXL-R and the G pixels PXL-Gr and PXL-Gb of the smallest unit UNT of the Bayer array. In the example in FIG. 4, the combinational information of the specific B pixel PXL-B at the time of reading is the high conversion gain signal HCG. The surrounding pixels, i.e., the R pixel PXL-R and G pixels PXL-Gr and PXL-Gb, are low conversion gain signals LCG.

In this case, since the combinational information is a low conversion gain signal LCG for all of the surrounding pixels of the specific B pixel PXL-B, i.e., the three pixels of the R pixel PXL-R and G pixels PXL-Gr and PXL-Gb, and since the number of the pixels in which the combinational information is the low conversion gain signal LCG is larger by a ratio of 3 to 1 among the four pixels of the smallest unit UNT, the signal processing part 710 sets (corrects) the combinational information of the specific B pixel PXL-B to a low conversion gain signal LCG instead of a high conversion gain signal HCG.

Figure 5:
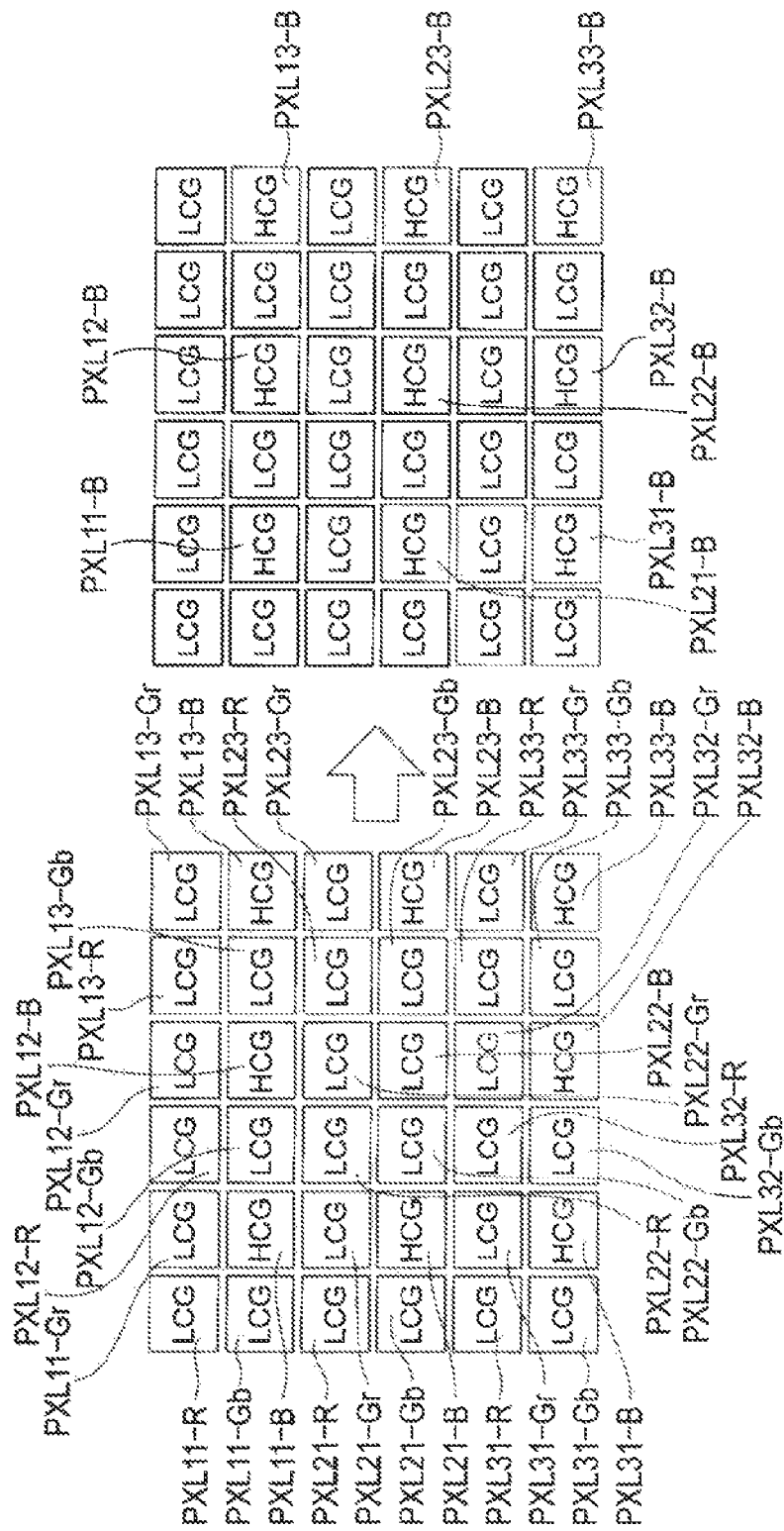

Note that, the surrounding pixels of the specific pixel are not limited to the three pixels of the smallest unit UNT of the Bayer array. FIG. 5 is a view for explaining an example in which, as the surrounding pixels of the specific B pixel PXL-B, a plurality of pixels having the same color as the specific pixel are employed and in which their combinational information is referred to.

For example, the signal processing part 710, as shown in FIG. 5, employs, as the surrounding pixels of the specific B pixel PXL22-B, eight pixels having the same color as the specific B pixel PXL22-B, that is, PXL11-B, PXL12-B, PXL13-B, PXL21-B, PXL23-B, PXL31-B, PXL32-B, and PXL33-B, and refers to their combinational information.

That is, the signal processing part 710 compares the combinational information of the specific B pixel PXL22-B (low conversion gain signal LCG in the present example) with the combinational information (high conversion gain signal HCG in the present example) of the surrounding pixels having the same color as the filter color of the specific B pixel PXL22-B, i.e., PXL11-B, PXL12-B, PXL13-B, PXL21-B, PXL23-B, PXL31-B, PXL32-B, and PXL33-B, and selects the optimum method of determination of the combinational information.

In this case, since the combinational information is the high conversion gain signal HCG for all of the surrounding pixels of the specific B pixel PXL22-B, i.e., the eight B pixels of PXL11-B, PXL12-B, PXL13-B, PXL21-B, PXL23-B, PXL31-B, PXL32-B, and PXL33-B, and since the number of the pixels in which the combinational information is the high conversion gain signal HCG is larger by a ratio of 8 to 1 among the nine pixels of the smallest unit UNT including the specific pixel, the signal processing part 710 sets (corrects) the combinational information of the specific B pixel PXL22-B to a high conversion gain signal HCG instead of the low conversion gain signal LCG.

Note that, the surrounding pixels are not limited to pixels having the same color. Various modes are possible, for example, combinational information of 16 surrounding pixels including pixels of the same color may be referred to. Further, in these cases, including the example of FIG. 5 as well, the arrangement is not limited to a Bayer array. The present invention can be applied to other arrangements as well.

In the present embodiment, the signal processing part 710 uses a plurality of methods of determination of the combinational information of the read-out signals.

Basically, in a case where the number of the pixels in which the combinational information is the low conversion gain signal LCG or high conversion gain signal HCG is larger by a ratio of 3 to 1 among the four pixels of the smallest unit UNT of the Bayer array, the signal processing part 710 employs the combinational information of the larger number of pixels as the combinational information of a specific pixel. When the number of the pixels in which the combinational information is the low conversion gain signal LCG or high conversion gain signal HCG is larger by a ratio of 4 to 0 among the four pixels of the smallest unit UNT of the Bayer array, the signal processing part 710 does not correct the combinational information of a specific pixel, but keeps it as it is. When the number of the pixels in which the combinational information is the low conversion gain signal LCG and the number of the pixels in which the combinational information is the high conversion gain signal HCG are equal by a ratio of 2 to 2 among the four pixels of the smallest unit UNT of the Bayer array, the signal processing part 710 can employ one of a plurality of methods of determination since there are a plurality of methods of determination of combinational information to be employed as the combinational information of a specific pixel.

For example, in a first method, when the number of the pixels in which the combinational information is the low conversion gain signal LCG and the number of the pixels in which the combinational information is the high conversion gain signal HCG are equal by a ratio of 2 to 2 among the four pixels of the smallest unit UNT of the Bayer array, the combinational information of the specific pixel is made to match the combinational information of the G pixels PXL-Gr and PXL-Gb (low conversion gain signals LCG or high conversion gain signals HCG.

For example, in a second method, when the number of the pixels in which the combinational information is the low conversion gain signal LCG and the number of the pixels in which the combinational information is the high conversion gain signal HCG are equal by a ratio of 2 to 2 among the four pixels of the smallest unit UNT of the Bayer array, the combinational information of the specific pixel is compared with the surrounding pixels having the same color and is made to match the combinational information of the surrounding same colored pixels (low conversion gain signals LCG or high conversion gain signals HCG).

For example, in a third method, when the number of the pixels in which the combinational information is the low conversion gain signal LCG and the number of the pixels in which the combinational information is the high conversion gain signal HCG are equal by a ratio of 2 to 2 among the four pixels of the smallest unit UNT of the Bayer array, the combinational information of the specific pixel is compared with the surrounding 16 pixels and is made to match with the combinational information of the surrounding 16 pixels (low conversion gain signals LCG or high conversion gain signals HCG)

For example, the signal processing part 710 can have a function of selecting the optimum method of determination of the combinational information by judging it by the numbers of times the methods of determination of the combinational information are employed for the surrounding pixels. Further, the signal processing part 710 can have a function of selecting the optimum method of determination of the combinational information by comparing the combinational information of a specific pixel and the combinational information of the surrounding pixels having the same color as the filter color of the specific pixel.

When selecting the optimum method of determination of the combinational information, the signal processing part 710 can have a function of referring to the level of a luminance signal generated from for example an edge portion of each colored pixel.

Further, when selecting the optimum method of determination of the combinational information, the signal processing part 710 can have a function of referring to calculated color temperature information.

The signal processing port 710 can have a function of determining the method of determination of the combinational information based on the change along with time of the read-out signal from each of the pixels which are referred to.

Further, the signal processing part 710 can have a function of dividing the interior of one screes into a plurality of regions and restricting the method of determination of the combinational information to be selected in units of those divided regions.

Further, the signal processing part 710 in the present embodiment is configured so that it can dynamically change the threshold value which is applied to the combinational processing. The signal processing part 710, as the threshold value, applies to the combinational processing a reference threshold value (center threshold value) Joint Thresh (hereinafter, J_Thresh) which is set in advance and a new threshold value determined by performing a comparison operation (for example addition or subtraction) of the reference threshold value J_Thresh and a predetermined step value step $\alpha$ ($\alpha$ is a natural number).

Note that, the reference threshold value (center threshold value) J_Thresh which is set in advance is for example written into a register (REG) as the memory part in a rewritable manner.

The signal processing part 710 has a lighting processing part which, for example, performs weighting processing on the plurality of read-out signals covered by the combinational operation (high conversion gain signal HCG and low conversion gain signal LCG) in accordance with the result of comparison between the read-out signal used as the reference among the plurality of read-exit signals (for example the high conversion gain signal HCG) and the corresponding threshold value (J_Thresh, J_Thresh±step$\alpha$). The weighting processing part, at the signal level of an area sandwiched by threshold values, calculates an average weighting value according to the weighting value assigned to this area and outputs the average weighting value as the combined signal of that area.

Further, the weighting processing part in the signal processing part 710 is configured including an average processing function for averaging the plurality of read-out signals. The average processing function converts the signals at the signal level of the area sandwiched by the threshold values to a single output with the use of the averaged value.

Below, an example of the configuration of a pixel PXL capable of generating a low conversion gain signal LCG and high conversion gain signal HCG, will be explaine, then an example of the configuration in the signal processing part 710 in the DSP part 70 and concrete combinational processing of the low conversion gain signal LCG and high conversion gain signal HCG will be explained.

Figure 6:
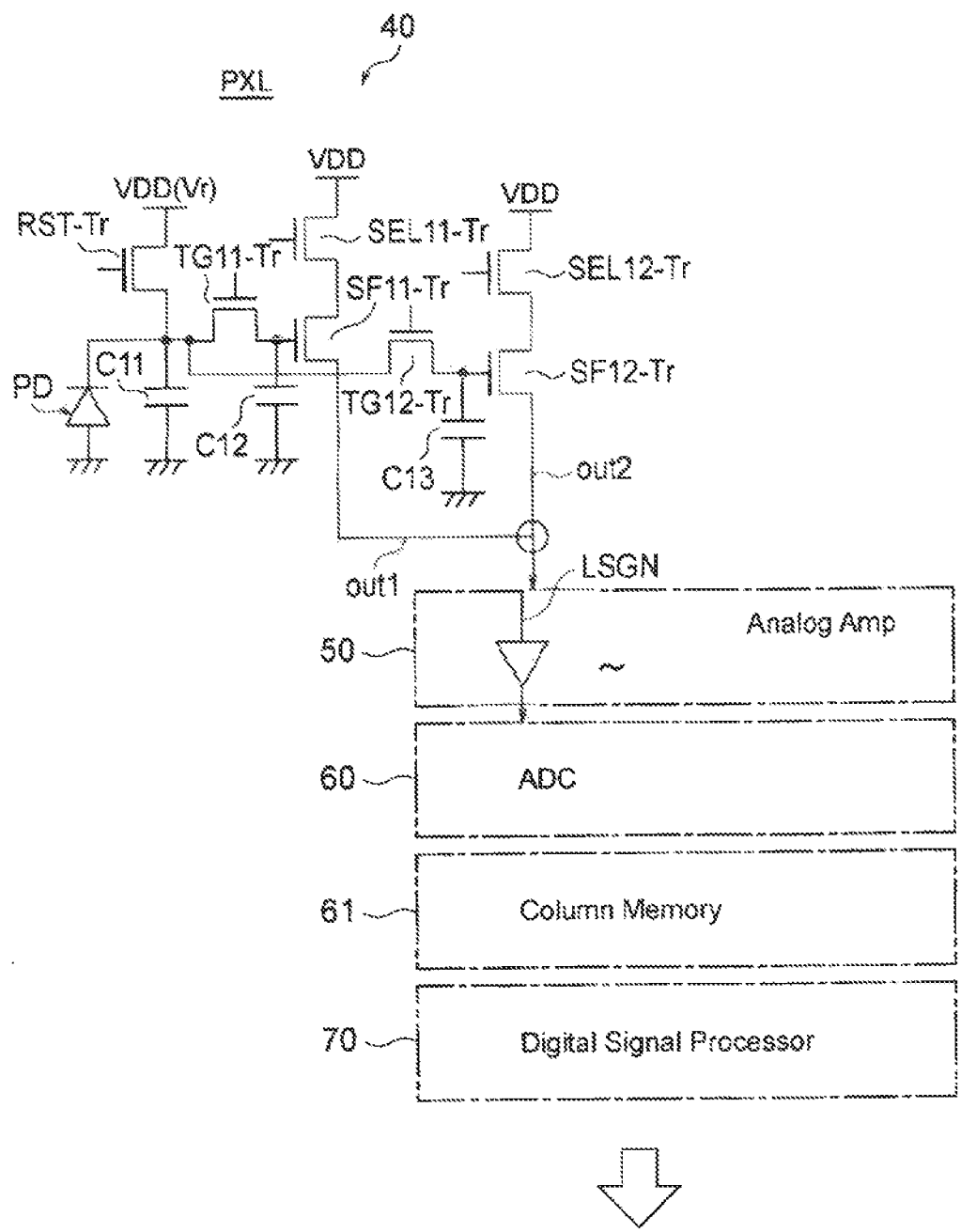
FIG. 6 is a view showing an example of a configuration of a pixel capable of generating a low conversion gain signal and a high conversion gain signal in a pixel array part according to the first embodiment.

Example of Configuration of Pixel PXL in Pixel Array Part 40 FIG. 6 is a view showing an example of the configuration of a pixel PXL capable of generating a low conversion gain signal LCG and high conversion gain signal HCG in the pixel array part 40 according to the first embodiment.

The pixel PXL in FIG. 6 has a photodiode PD, a capacity C11 which is connected to the cathode side of the photodiode PD and is formed by a parasitic capacitance or additional capacitance, and a reset transistor RST-Tr resetting the photodiode PD and capacities C11 to C13.

The photodiode PD generates a signal charge (here, electrons) in an amount in accordance with the quantity of incident light and accumulates the same. Below, the explanation will be given for a case where the signal charge is electrons and each transistor is an n-type transistor. However, the signal charges may be holes and each transistor may be a p-type transistor as well.

The pixel PXL has a transfer transistor TG11-Tr as the transfer switch connected to the capacity C11, a capacity C12 for accumulating charges transferred from the photodiode PD and capacity C11, a selection transistor SEL11-Tr as a selection switch, and a source follower transistor SF11-Tr connected in the gate to the capacity C12.

Further, the pixel PXL has a transfer transistor TG12-Tr as the transfer switch connected to the capacity C11, a capacity C13 accumulating charges transferred from the photodiode PD and capacity C11, a selection transistor SEL12-Tr as the selection switch, and a source follower transistor SF12-Tr connected in the gate to the capacity C13.

Note that, at the gates of the reset transistor RST-Tr, transfer transistors TG11-Tr and TG12-Tr, and selection transistors SEL11-Tr and SEL12-Tr in the pixel PXL, control pulses S30 generated in the timing controller 30 are supplied for on/off control.

In this way, the pixel PXL in FIG. 6 is comprised so that the charges accumulated in the photodiode PD and capacity C11 are output through two output systems out1 and out2. In the example in FIG. 6 the low conversion gain signal HCG is output to the output system out1, and the high conversion gain signal HCG is output to the output system out2. Further, in the configuration of FIG. 6, for example, the output system out1 and output system out2 are subjected to wired-OR, and the high conversion gain signal HCG and the low conversion gain signal LCG of two systems in columns are output in a time division manner to a common signal line (vertical signal line) LSGN.

Next, the operation in the pixel PXL in FIG. 6 will be explained.

The potentials of the photodiode PD and the capacity C11 formed by a parasitic capacitance or additional capacitance are reset to a reset potential Vr (VDD in the example in FIG. 6) by the reset transistor RST-Tr. When light is incident upon the photodiode PD in an accumulation period, the generated photocharges are accumulated in the photodiode PD and capacity C11. By turning on the transfer transistor TG11-Tr as the transfer switch or the transfer transistor TG12-Tr as the transfer switch in this state, the potential of the capacity C12 or capacity C13 changes in accordance with the generated photocharges.

Here, in the capacity C12 and capacity C13, the parasitic capacitances of the gate electrodes of the source follower transistors SF11-Tr and SF12-Tr are individually dominant. The selection transistors SEL11-Tr and SEL12-Tr are row selection switches. They are switches for selecting certain rows of pixels PXL arranged in the state of a two-dimensional array. The selection transistors SEL11-Tr and SEL12-Tr are connected to the power supply VDD. The output system out1 and output system out2 are connected through the signal line LSGN to a constant current source not shown in the diagram and forms a source follower amplifier together with the source follower transistors SF11-Tr and SF12-Tr. Also, the selection transistors SEL11-Tr and SEL12-Tr form a source follower amplifier together with the constant current source in the same way as the source follower transistors SF11-Tr and SF12-Tr. Either source follower amplifier can be selected by selecting the transistors TG11-Tr and transistor SEL11-Tr or selecting the transistor TG12-Tr and transistor SEL12-Tr.

Due to this, the two systems of the high conversion gain signal HCG and low conversion gain signal LCG are output to the common signal line (vertical signal line) LSGN in a time division manner. The advantage that the read capacity C12 or C13 can be selected according to the case resides in that the dynamic range (DR: D-range) can be selected according to the image capture conditions.

Concrete Combinational Processing of Low Conversion Gain Signal LCG and High Conversion Gain Signal HCG in DSP Part 70

Next, an example of the configuration of the signal processing part 710 in the ESP part 70 and the concrete combinational processing of the low conversion gain signal LCG and the high conversion gain signal HCG will be explained.

In the following explanation, a plurality of read-out signals read out from the pixels PXL including the photoelectric conversion elements include at least one set of a low conversion gain signal LCG and a high conversion gain signal HCG which is saturated by a smaller quantity of incident light in comparison with the low conversion gain signal LCG.

Figure 7:
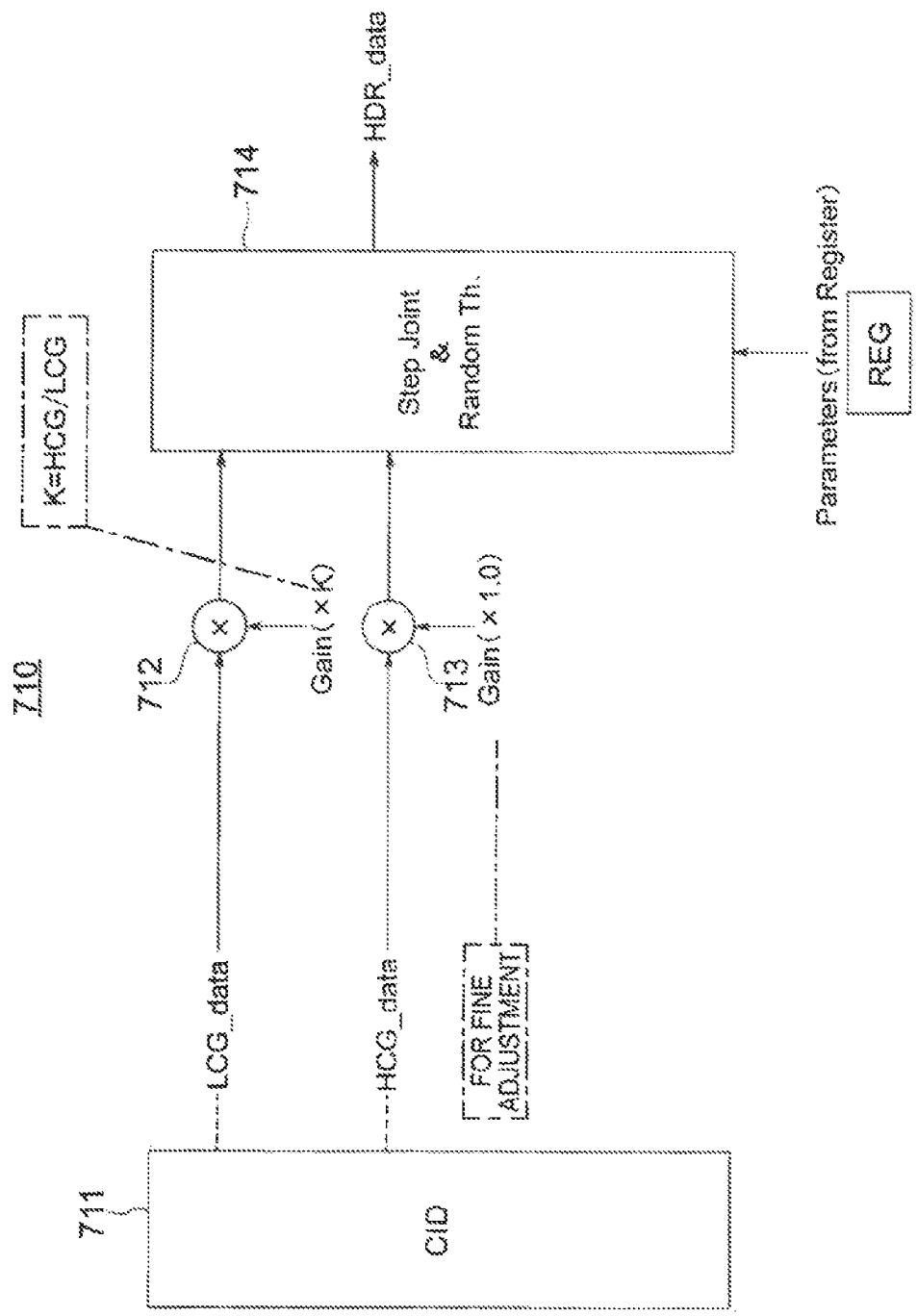
FIG. 7 is a view showing an example of a configuration of a signal processing part according to the first embodiment of the present invention.

FIG. 7 is a view showing an example of the configuration of the signal processing part according to the first embodiment of the present invention.

The signal processing part 710 in FIG. 7 has a combinational information judging part 711, multipliers 712 and 713, and a combinational processing part 714 having a function as a weighting processing part.

When combining (assembling) the high conversion gain signal HCG and the low conversion gain signal LCG to improve the dynamic range, the combinational information judging part 711 has the following configuration in order to alleviate the problems due to the deterioration of the precision of the linearity occurring in combinational processing, in particular, in order to suppress the false color generated due to the change of the correlation with the surrounding pixels (pixels in the surroundings) caused by the change of the color temperature and to improve the quality of the image.

When combining the read-out signals from one specific pixel, the combinational information judging part 711 determines the combinational information concerning the combinational operation of the read-out signals with reference to the combinational information concerning the combinational operation of the surrounding pixels of the one pixel.

The combinational information judging part 711, as the combinational information of the surrounding pixels of the specific pixel, refers to for example combinational information of the pixels forming the smallest unit UNT of the Bayer array, that is, information indicating whether a signal is a high conversion gain signal HCG or low conversion gain signal LCG.

Further, the combinational information judging part 711 employs 8 pixels having the same color as the specific pixel as the surrounding pixels of the specific pixel and refers to their combinational information.

Note that, the surrounding pixels, as explained before, are not limited to pixels of the same color. Various modes are possible, for example, combinational information of 16 surrounding pixels including pixels of the same color may be referred to.

In the present embodiment, the combinational information judging part 711 uses a plurality of methods of determination of the combinational information of read-out signals, for example, first, second, and third methods. Here, the first method MTD1, second method MTD2, and third method MTD3 will be explained with reference to FIGS. 8 to 12.

Figure 8:
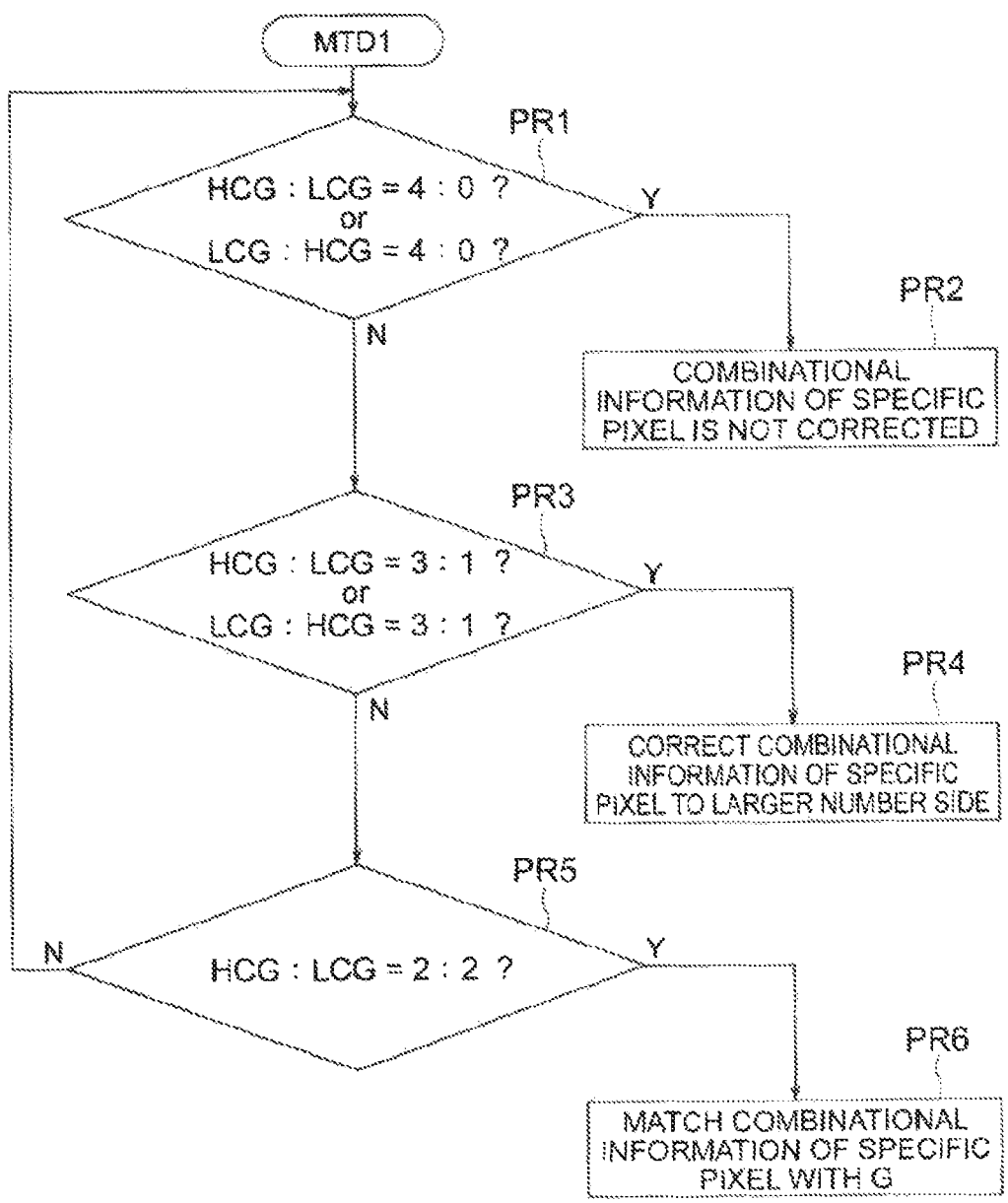
FIG. 8 is a view for explaining a first method of determination of combinational information of read-out signals according to the embodiment.
Figure 9:
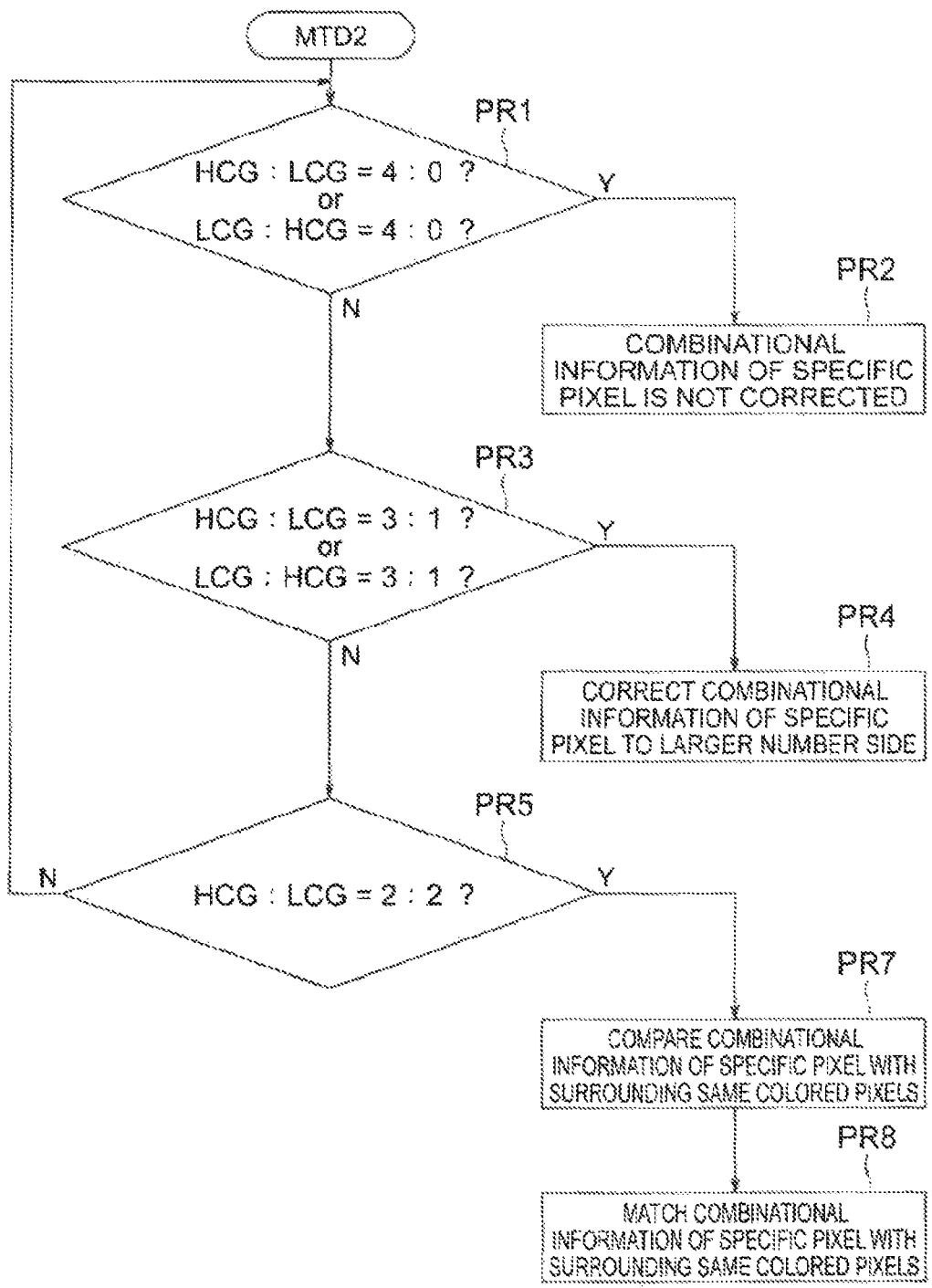
FIG. 9 is a view for explaining a second method of determination of combinational information of read-out signals according to the embodiment.
Figure 10:
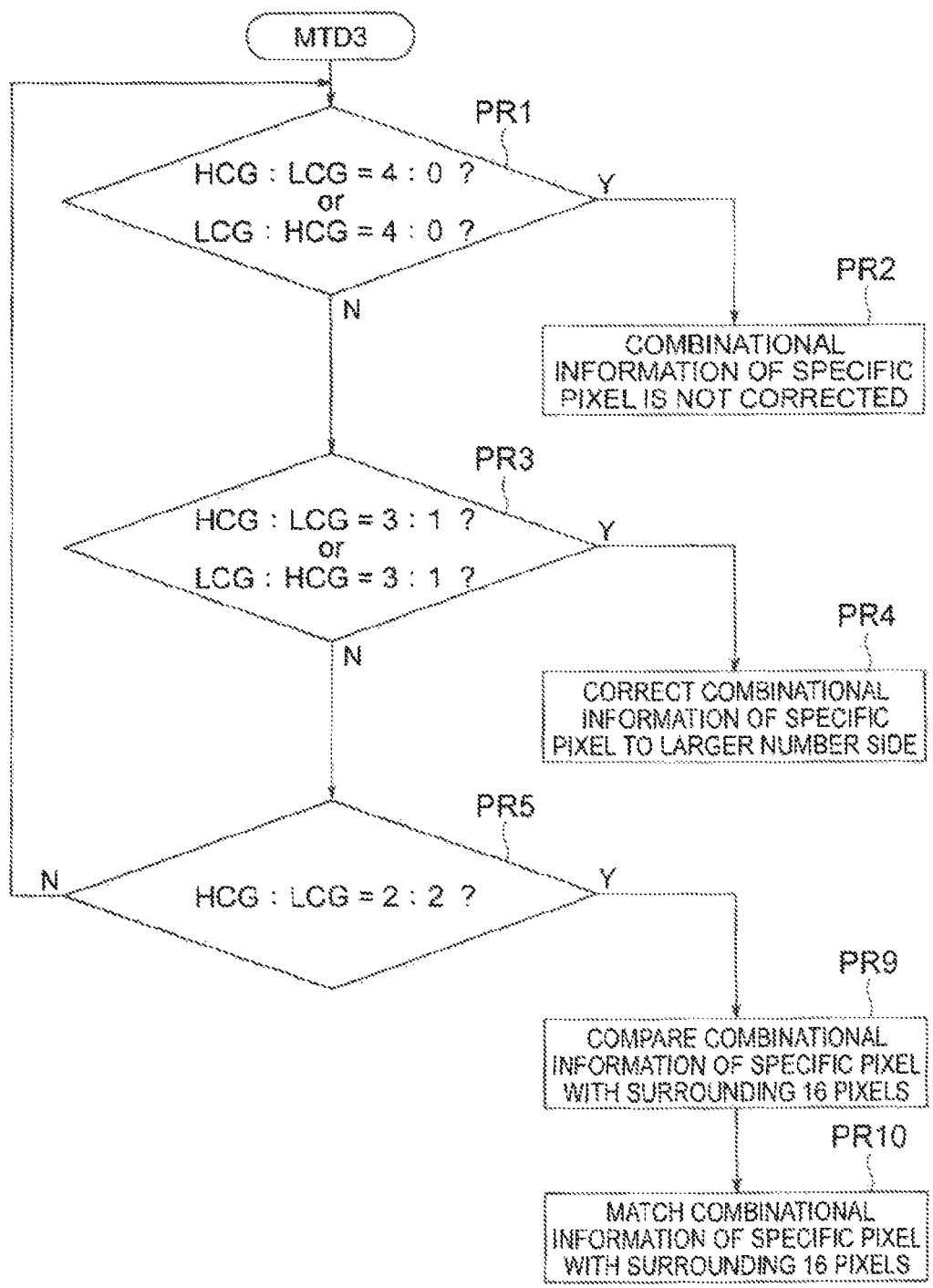
FIG. 10 is a view for explaining a third method of determination of combinational information of read-out signals according to the embodiment.
Figure 11:
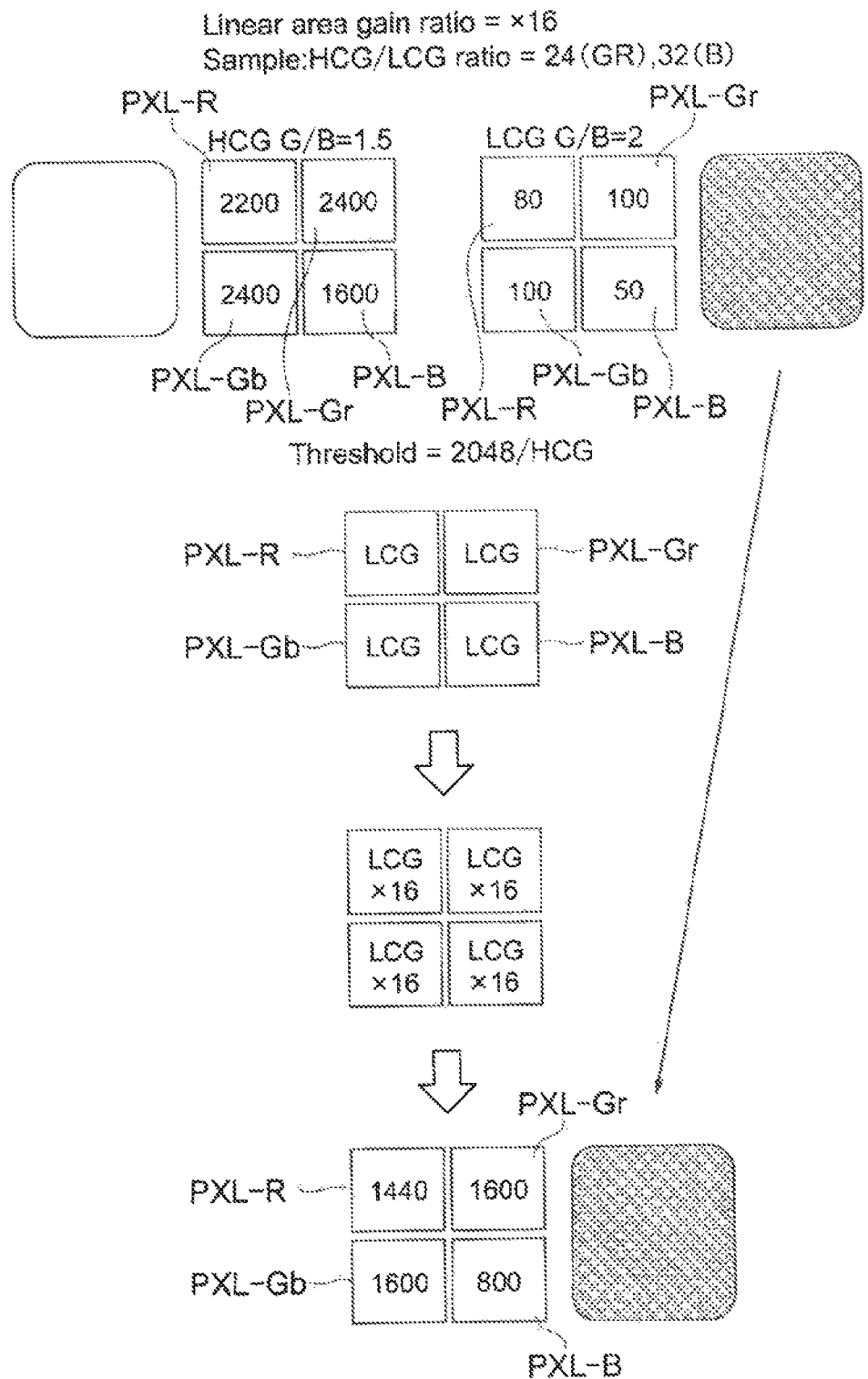
FIG. 11 is a view showing a generation process and result of a high dynamic range signal in a case where the method of determination of combinational information of read-out signals according to the present embodiment is employed.
Figure 12:
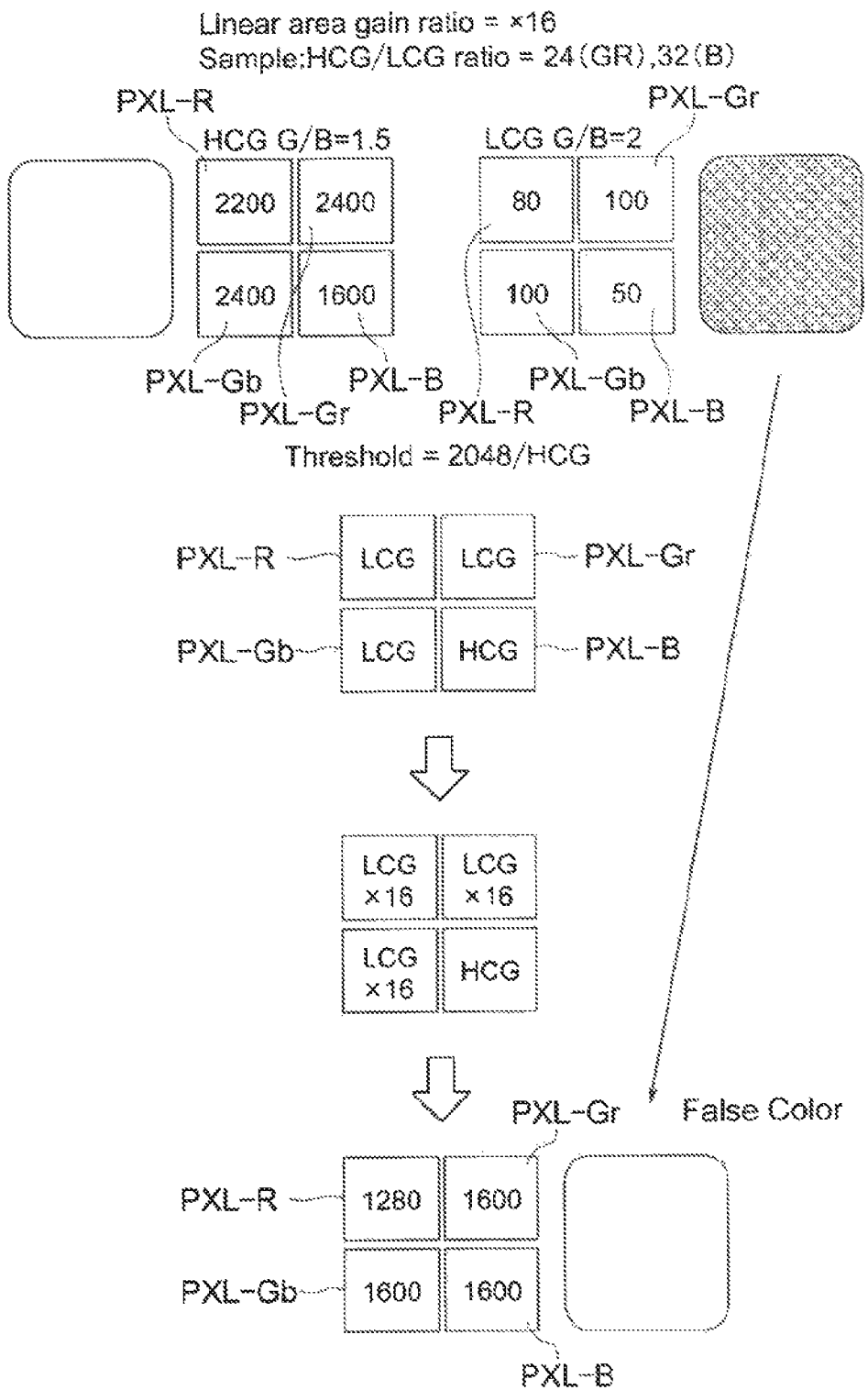
FIG. 12 is a view showing a process and result of generation of a high dynamic range signal in a case where the method of determination combinational information of read-out signals according to the present embodiment is not employed.

FIG. 8 is a view for explaining the first method of determination of the combinational information of the read-out signals according to the present embodiment. FIG. 9 is a view for explaining the second method of determination of the combinational information of the read-out signals according to the present embodiment. FIG. 10 is a view for explaining the third method of determination of the combinational information of the read-out signals according to the present embodiment. FIG. 11 is a view showing a process and results of generation of a high dynamic range signal when the method of determination of combinational information of the read-out signals according to the present embodiment is employed. FIG. 12 is a view showing a process and results of generation of a high dynamic range signal when the method of determination of combinational information of the read-out signals according to the present embodiment is not employed.

First Method MDT1

In the first method MTD1, as shown in FIG. 8, the combinational information judging part 711 judges whether the combinational information of the four pixels of the smallest unit UNT of the Bayer array is low conversion gain signals LCG or high conversion gain signals HCG by a ratio of 4 to 0 (process PR1).

When judging in the process PR1 that the combinational information of the four pixels of the smallest unit UNT of the Bayer array is low conversion gain signals LCG or high conversion gain signals HCG by a ratio of 4 to 0, the combinational information judging part 711 does not correct the combinational information of the specific pixel but keeps it as it is (process PR2).

When judging in the process PR1 that the combinational information of the four pixels of the smallest unit UNT of the Bayer array is not low conversion gain signals LCG or high conversion gain signals HCG by a ratio of 4 to 0, the combinational information judging part 711 shifts to the processing of the process PR3.

The combinational information judging part 711, in the process PR3, judges whether the number of the low conversion gain signals LCG or high conversion gain signals HCG is larger by a ratio of 3 to 1 in the combinational information of four pixels of the smallest unit UNT of the Bayer array.

When judging in the process PR1 that the number of the low conversion gain signals LCG or high conversion gain signals HCG is larger by a ratio of 3 to 1 in the combinational information of the four pixels of the smallest unit of the Bayer array, the combinational information judging part 711 employs the combinational information of the larger number side as the combinational information of the specific pixel (process PR4).

In the example shown in FIG. 11, the specific pixel is the B pixel PXL-B of the smallest unit UNT of the Bayer array.

The surrounding pixels are the R pixel PXL-R and the G pixels PXL-Gr and PXL-Gb of the smallest unit UNT of the Bayer array. In the example in FIG. 11, the combinational information of the specific B pixel PXL-B at the time of reading is the high conversion gain signal HCG, while the surrounding pixels, i.e., the R pixel PXL-R and the G pixels PXL-Gr and PXL-Gb, are low conversion gain signals LCG.

In this case, since the combinational information is the low conversion gain signal LCG for all of the surrounding pixels of the specific B pixel PXL-B, that is, the three pixels of the R pixel PXL-R and G pixels PXL-Gr and PXL-Gb, and the number of the pixels in which the combinational information is the low conversion gain signal LCG is larger by a ratio of 3 to 1 among the four pixels of the smallest unit UNT, the combinational information judging part 711 sets (corrects) the combinational information of the specific B pixel PXL-B to the low conversion gain signal LCG instead of the high conversion gain signal HCG. The output cods value of the specific B pixel PXL-B at that time becomes 800 (50×16) when setting the ratio of HCG/LCG to 16.

By employing this processing, when combining (assembling) the high conversion gain signal HCG and the low conversion gain signal LCG to improve the dynamic range, the combinational information judging part 711 alleviates the problems due to the deterioration of the precision of the linearity occurring in combinational processing. In particular, it suppresses the false color generated due to the change of correlation with the surrounding pixels (pixels in the surroundings) due to the change of the color temperature and improves the quality of the image.

On the other hand, as shown in FIG. 12, if not employing this processing, when combining (assembling) the high conversion gain signal HCG and the low conversion gain signal LCG to improve the dynamic range, a problem arises due to the deterioration of the precision of linearity in the combinational processing. In particular, a false color is generated due to the change of correlation with the surrounding pixels (pixels in the surroundings) doe to the change of the color temperature.

When judging in the process PR3 that the ratio of the number of the low conversion gain signals LCG and the number of the high conversion gain signals HCG is not 3 to 1 or vice versa in the combinational information of the four pixels of the smallest unit UNT of the Bayer array, the combinational information judging part 711 shifts to the processing in the process PR5.

The combinational information judging part 711 judges in the process PR5 whether the numbers of the low conversion gain signal LCG and the high conversion gain signal HCG are equal by a ratio of 2 to 2 in the combinational information of the four pixels of the smallest unit of the Bayer array.

When judging in the process PR5 that the numbers of the low conversion gain signal LCG and the high conversion gain signal HCG are equal by a ratio of 2 to 2 in the combinational information of the four pixels of the smallest unit of the Bayer array, in this first method MTD1, the combinational information judging part 711 makes the examinational information of the specific pixel match with the combinational information of the G pixels PXL-Gr and PXL-Gb (low conversion gain signals LCG or high conversion gain signals HCG) (process PR6).

When judging in the process PR5 that the numbers of the low conversion gain signal LCG and the high conversion gain signal HCG are not equal by a ratio of 2 to 2 in the combinational information of the four pixels of the smallest unit of the Bayer array, for example, the combinational information judging part 711 shifts to the processing in the process PR1.

Second Method MTD2

In the second method MTD2, as shown in FIG. 8 and FIG. 9, the processing of the combinational information judging part 711 is different from the first method MTD1 in the processing when judging the numbers are equal in the process PR5.

When judging in the process PR5 that the numbers of the low conversion gain signal LCG and the high conversion gain signal HCG are equal by a ratio of 2 to 2 in the combinational information of the four pixels of the smallest unit UNT of the Bayer array, in this second method MTD2, the examinational information judging part 711 compares the combinational information of the specific pixel with the surrounding same colored pixels (process PR7) and makes it match with the combinational information of the surrounding same colored pixels (low conversion gain signals LCG or high conversion gain signals HCG) (process PR8).

Third Method MTD3

In the third method MTD3, as shorn in FIGS. 8 and 10, the processing of the combinational information judging part 711 differs from the first method MID1 in the processing when judging the numbers are equal in the process PR5.

When judging in the process PR5 that the numbers of the low conversion gain signal LCG and the high conversion gain signal HCG are equal by a ratio of 2 to 2 in the combinational information of the four pixels of the smallest unit UNT of the Bayer array, in this third method MTD3, the combinational information judging part 711 compares the combinational information of the specific pixel with the surrounding 16 pixels (process PR9) and makes it match with the combinational information of the surrounding 16 pixels (low conversion gain signals LCG or high conversion gain signals HCG) (process PR10).

In this way, in the combinational information judging part 711 in the present embodiment, in the case where the numbers of the low conversion gain signal LCG and the high conversion gain signal HCG are equal by a ratio of 2 to 2 in the combinational information of the four pixels of the smallest unit UNT of the Bayer array, there are a plurality of methods of determination of the combinational information to be employed as the combinational information of the specific pixel. It is possible to employ one among these plurality of methods.

The combinational information judging part 711 in the present embodiment, as explained before, can have the function of selecting the optimum method of determination of the combinational information by judging it by the numbers of times the methods of determination of the combinational information are employed for the surrounding pixels. Further, the signal processing part 710 can have a function of selecting the optimum method of determination of the combinational information by comparing the combinational information of a specific pixel and the combinational information of the surrounding pixels having the same color as the filter color of the specific pixel.

When selecting the optimum method of determination of the combinational information, the combinational information judging part 711 can have a function of referring to the level of a luminance signal generated from for example an edge portion of each colored pixel. Further, when selecting the optimum method of determination of the combinational information, the combinational information judging part 711 can have a function of referring to calculated color temperature information. Further, the combinational information judging part 711 can have the function of determining the method of determination of the combinational information based on the change along with tine of the read-out signal from each of the pixels which are referred to. Further, the combinational information judging part 711 can have the function of dividing the interior of one screen into a plurality of regions and restricting the method of determination of the combinational information in units of those divided regions.

Here, we will return to the explanation of FIG. 7. The multiplier 712 multiplies the low conversion gain signal LCG which is input by a gain ratio K (=HCG/LCG) in order to make the inclination of the low conversion gain signal LCG having linearity before saturation equal to the inclination of the high conversion gain signal HCG having linearity before saturation in the same way and supplies the result to the combinational processing part 714.

The multiplier 713 multiplies the high conversion gain signal HCG which is input by the gain ratio 1.0 and supplies the result to the combinational processing part 714 in order to perform fine adjustment of the inclination of the high conversion gain signal HCG. Note that, the multiplier 713 is provided for fine adjustment and is not always necessary, therefore need not always be provided.

The combinational processing part 714 receives the low conversion gain signal LCG and high conversion gain signal HCG adjusted so that their inclinations became the same and combines the low conversion gain signal LCG and high conversion gain signal HCG by combinational processing in a non-saturated area ANSAT before the saturation of the high conversion gain signal HCG and in which linearity is maintained. The combinational processing part 714 functions as the weighting processing part. It has a function as a weighting processing part which performs weighting processing on the high conversion gain signal HCG and low conversion gain signal LCG to be combined in accordance with the result of a comparison between for example the high conversion gain signal HCG used as the reference among the plurality of low conversion gain signals LCG and high conversion gain signals HCG and the corresponding threshold value (J_Thresh, J_Thresh±stepα). The combinational processing part 714, as the weighting processing part, has a function of calculating the average weighting value according to the weighting value assigned to the area sandwiched between the threshold values at the signal level of this area and outputting the average weighting value as the combined signal of that area.

Further, the combinational processing part 714, as the weighting processing part, is configured including an average processing function for averaging the low conversion gain signals LCG and the high conversion gain signals HCG. The average processing function is for converting the averaged value of the signals at the signal level of the area sandwiched between the threshold values to a single output.

A plurality of signal processing parts 710 having the above configuration are arranged corresponding to the columns in the matrix arrangement in the pixel array part 40.

The basic block configuration of the signal processing part 710 according to the present embodiment was explained above. Next, a combinational method for combining two signals, i.e., a high conversion gain signal HCG and a low conversion gain signal LCG, having different characteristics by the signal processing part 710 according to the present embodiment and forming a high dynamic range signal will be more specifically explained by illustration.

Figure 13A:
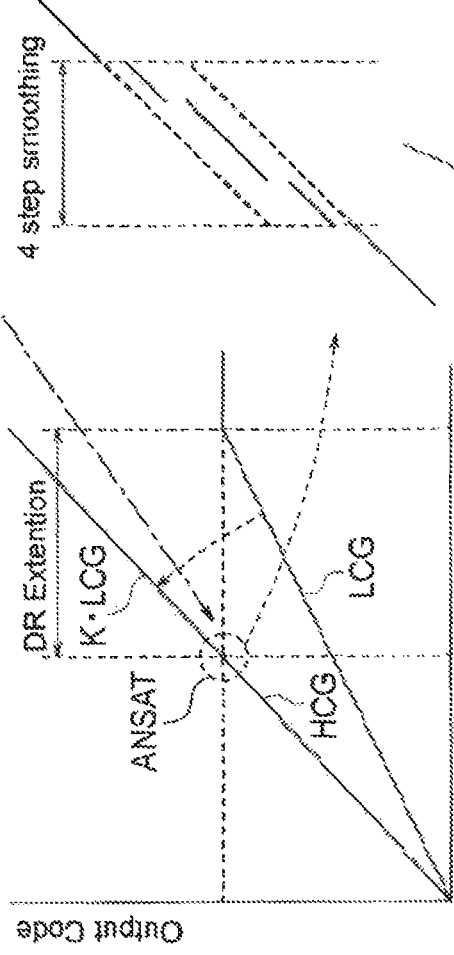
FIG. 13(A), FIG. 13(B) and FIG. 13(C) are a view for specifically explaining a combining method of combining a high conversion gain signal and a low conversion gain signal to obtain a high dynamic range signal.
Figure 13B:
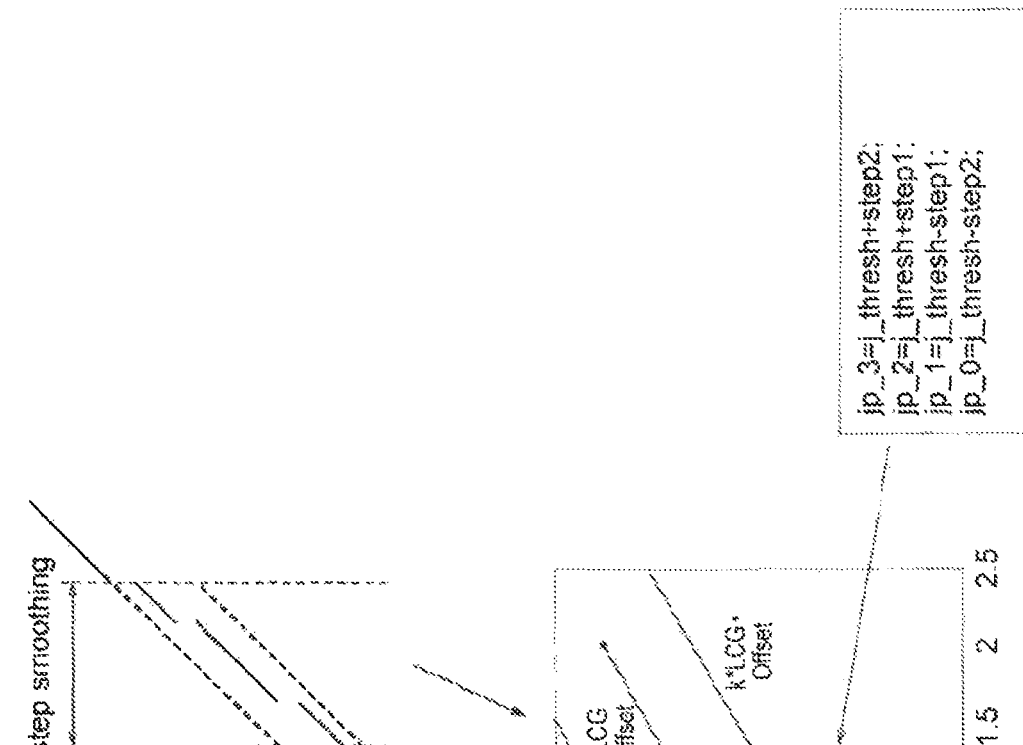
Figure 13C:
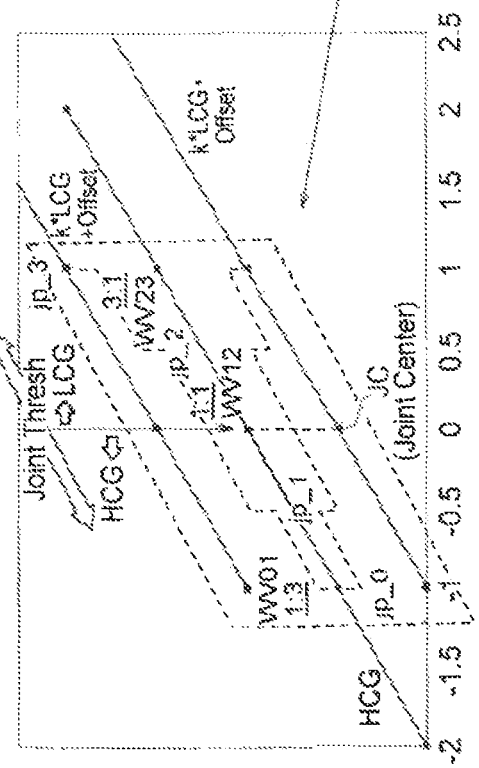
Figure 14:
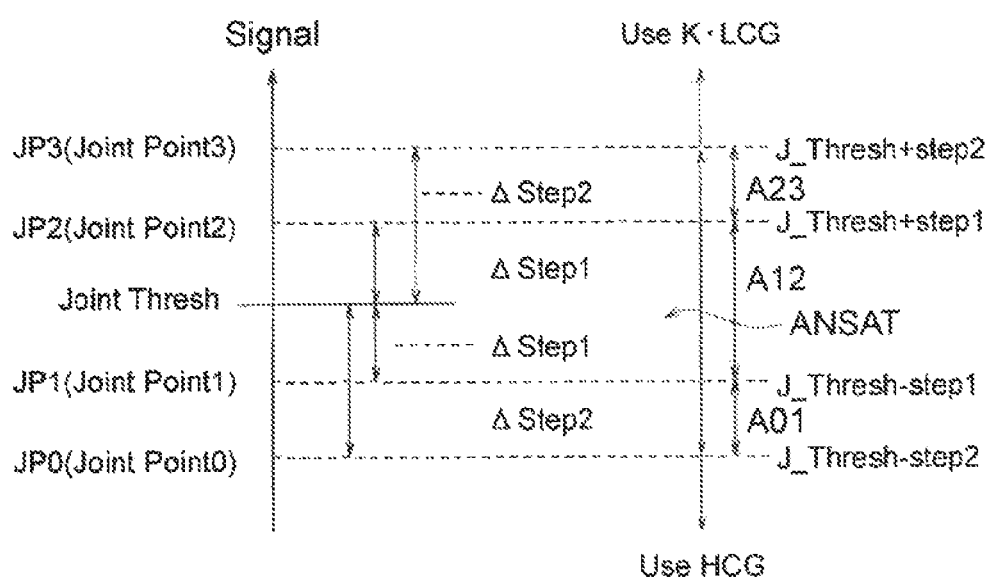
FIG. 14 is a view schematically shewing the relationships among a signal level, center threshold value, each join position (point), and a dynamically set threshold value where the low conversion gain signal and the high conversion gain signal are smoothly combined stepwise in four steps.

FIGS. 13(A) to 13(C) are views for specifically explaining the compositional method of combining the high conversion gain signal HCG and the low conversion gain signal LCG to form a high dynamic range signal. FIG. 13(A) shows an outline of processing for adjustment so that the inclinations of the high conversion gain signal HCG and the low conversion gain signal LCG become the same. FIG. 13 (B) shows that, in the non-saturated area ANSAT of the high conversion gain signal HCG before saturation and in which linearity is maintained, the high conversion gain signal HCG and the low conversion gain signal LCG are smoothly combined stepwise in fair steps by the combinational processing. FIG. 13 (C) schematically illustrates the relationships among the center threshold value J_Thresh, join positions (points) jp0 to jp3, dynamically set threshold values (J_Thresh-step2), (J_Thresh-step1), (J_Thresh+step1), and (J_Thresh+step2), and the weighting value in a case where the high conversion gain signal HCG and the low conversion gain signal LCG are smoothly confined stepwise in fair steps. FIG. 14 schematically shows the relationships among the signal level, center threshold value J_Thresh, join positions (points) jp0 to jp3, dynamically set threshold values (J_Thresh-step2), (J_Thresh-step1), (J_Thresh+step1), and (J_Thresh+step2), and the area between the threshold values in the case where the high conversion gain signal HCG and the low conversion gain signal LCG are smoothly combined stepwisely in four steps.

In FIG. 13(A), FIG. 13(B) and FIG. 13(C), the high conversion gain signal HCG and low conversion gain signal LCG correspond to the two systems of signals explained before. Here, as shown in FIG. 6, both of the high conversion gain signal HCG and the low conversion gain signal LCG are digital signals. As explained before, the high conversion gain signal HCG is a high gain output signal from the photoelectric conversion element part. However, it is saturated by a smaller quantity of incident light by that amount in comparison with the low conversion gain signal LCG. The low conversion gain signal LCG is a low gain output signal, so has enough of a margin before the quantity of incident light which reaches saturation, so is larger in comparison with the high conversion gain signal HCG. Therefore, in the signal processing part 710 in the DSP part 70, the inclinations of the low conversion gain signal LCG and the high conversion gain signal HCG are made the same. These two signals are combined before the saturation of the high conversion gain signal HCG, that is, in the non-saturated area ANSAT in which the linearity is maintained, to thereby obtain a signal raised in the dynamic range (DR).

The combinational processing part 714 in the signal processing part 710 can perform combinational processing by using for example the high conversion gain signal HCG as a reference. The combinational processing part 714, for example, as shown in FIGS. 13(C) and 14, sets the reference threshold value as the center threshold value J_Thresh at the position JC of the center part (Joint Center) of the non-saturated area ANSAT.

Between the joint center JC at which the center threshold value J_Thresh is set and a high gain signal endmost part side join position jp (joint point) 0 at which the combinational signal should be joined with the high conversion gain signal HCG, the combinational processing part 714, for example, as shown in FIGS. 13 (C) and 14, sets the two high gain side join positions jp0 and jp1 including the high gain signal endmost part side join position jp0 and sets high gain side step values (−)step1 and (−)step2 (step2>step1) corresponding to the set high gain side join positions jp1 and jp0 which gradually because larger from the joint center JC toward the high gain signal endmost part.

Between the joint center JC at which the center threshold value J_Thresh is set and a low gain signal endmost part side join position jp3 at which the combined signal should be joined with the low conversion gain signal LCG, the combinational processing part 714, for example, as shown in FIGS. 13 (C) and 14, sets the two low gain side join positions jp3 and jp2 including the low gain signal endmost part side join position jp3 and sets low gain side step values step1 and step2 (step2>step1) corresponding to the set low gain side join positions jp2 and jp3 which gradually become larger from the joint center JC toward the low gain signal endmost part.

Further, the examinational processing part 714, for example as shown in FIGS. 13 (C) and 14, subtracts the set high gain side step values step2 and step1 from the center threshold value J_Thresh and sets the results as new threshold values (J_Thresh+step2) and (J_Thresh+step1) of the corresponding high gain side join positions jp0 and jp1. The combinational processing part 714 applies the new threshold values and performs combinational processing in accordance with the results of comparison between the threshold values (J_Thresh+step2) and (J_Thresh+step1) at the high gain side join positions jp0 and jp1 and the high conversion gain signal HCG.

In the same way, the combinational processing part 714, for example as shown in FIGS. 13(C) and 14, adds the low gain side step values step1 and step2 set at the center threshold value J_Thresh and sets the results as the new threshold values (J_Thresh+step1) and (J_Thresh+step2) of the corresponding low gain side join positions jp2 and jp3. The combinational processing part 714 applies the new threshold values and performs the combinational processing in accordance with the results of comparison between the threshold values (J_Thresh+step1) and (J_Thresh+step2) at the low gain side join positions jp2 and jp3 and the high conversion gain signal HCG.

At the signal levels of the areas A01, A12, and A23 which are sandwiched by the values selected according to the comparison between the threshold values (J_Thresh+step2) or (J_Thresh+step1) of the high gain side join position jp0 or jp1 or the threshold values (J_Thresh+step1) or (J_Thresh+step2) of the low gain side join position jp2 or jp3 with the high conversion gain signal HCG, the combinational processing part 714, in the comparison processing according to the combinational processing, calculates average weighting values AVW01, AVW12, and AVW23 according to the weighting values WV01, WV12, and WV23 assigned to the areas A01, A12, and A23 and outputs the average weighting values AVW01, AVW2, and AVW23 as the combined signals (combined data) data_dbdr of those areas.

For example, in the area A01 sandwiched between the threshold value (J_Thresh+step2) of the high gain side join position jp0 and the threshold value (J_Thresh+step1) of the adjacent high gain side join position jp1, a weighting value WV01 of "1" is assigned to the low conversion gain signal LCG and a weighting value WV01 of "3" is assigned to the high conversion gain signal HCG (LCG:HCG=1:3).

In the area A12 sandwiched between the threshold value (J_Thresh+step1) at the high gain side join position jp1 and the threshold value (J_Thresh+step1) at the adjacent low gain side join position jp2, a weighting value WV12 of "1" is assigned to the low conversion gain signal LCG and a weighting value WV12 of "1" is assigned to the high conversion gain signal HCG (LCG:HCG=1:1).

In the area A23 sandwiched between the threshold value (J_Thresh+step1) of the low gain side join position jp2 and the threshold value (J_Thresh+step2) of the adjacent low gain side join position jp3, a weighting value WV23 of "3"

is assigned to the low conversion gain signal LCG and a weighting value WV23 of "1" is assigned to the high conversion gain signal HCG (LCG:HCG=3:1).

When the level of the high conversion gain signal HCG is smaller than the threshold value (J_Thresh+step2) as a result of a comparison between the threshold value (J_Thresh+step2) of the high gain signal endmost part side join position jp0 and the high conversion gain signal HCG (data_hcg), the combinational processing part 714 applies the high conversion gain signal HCG (data_hcg) as the combined signal (combined data) data_dhdr.

When the level of the high conversion gain signal HCG is larger than the threshold value (J_Thresh+step2) as a result of a comparison between the threshold value (J_Thresh+step2) of the low gain signal endmost part side join position jp3 and the high conversion gain signal HCG (data_hcg), the combinational processing part 714 applies the low conversion gain signal LCG (data_lcg) as the combined signal (combined data) data_dbdr.

Figure 15:
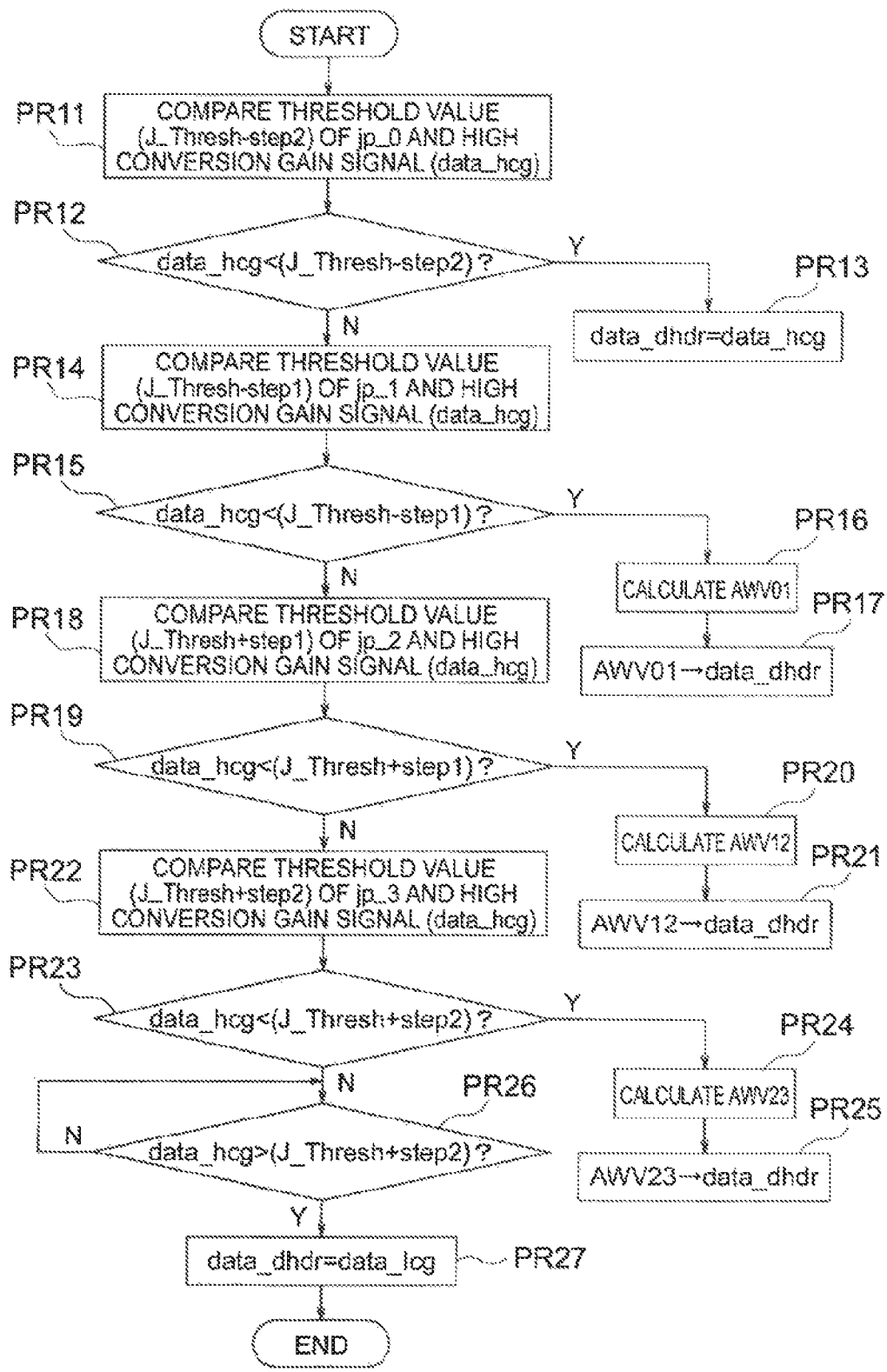
FIG. 15 is a flow chart for explaining an example of combinational processing in a signal processing part according to the first embodiment.

The configuration and function of the combinational processing part 714 in the signal processing part 710 were explained above. Here, an example of concrete combinational processing of the high conversion gain signal HCG and the low conversion gain signal LCG in the combinational processing part 714 will be explained. FIG. 15 is a flow chart for explaining an example of the combinational processing in the signal processing part 710 according to the present embodiment.

Now, when considering a case of combination using the high conversion gain signal HCG as the reference, it can be expressed as in the following description:

$$\text{data\_hcg=data\_hcg\_in+hcg\_offset} \quad \text{(Equation 1)}$$

When it is multiplied by the digital gain and is converted so that its inclination becomes the same as that of the high conversion gain signal HCG, the low conversion gain signal LCG can be expressed as follows:

$$\text{data\_lcg=(data\_lcg\_in+lcg\_offset)} \times K \quad \text{(Equation 2)}$$

where, K indicates the gain ratio of HCG/LCG.

In combining these two signals, the processing is carried out under the following set conditions:

if (data_hcg<($j\_thresh$+step2)) data_dhdr=data_hcg;

if (data_hcg<($j\_thresh$+step1)) data_dhdr=(data_hcg×3+data_lcg)/4;

if (data_hcg<($j\_thresh$+step1)) data_dhdr=(data_hcg+data$_1{_3}$lcg)/2;

if (data_hcg<($j\_thresh$+step2)) data_dhdr=(data_hcg+data_lcg×3)/4;

if (data_hcg>($j\_thresh$+step2)) data_dhdr=data_lcg; (Equation 3)

The processing for the combination of this combinational processing part 714 will be explained with reference to FIG. 15.

The combinational processing part 714, for example, first compares the threshold value (J_Thresh-step2) of the high gain signal endmost part side join position jp0 and the high conversion gain signal HCG (data_hcg) (process PR11) and judges whether the level of the high conversion gain signal HCG is smaller than the threshold value (J_Thresh+step2) (process PR2).

When judging in the process PR12 that the level of the high conversion gain signal HCG (data_hcg) is smaller than the threshold value (J_Thresh+step2) of the combinational processing part 714 applies the high conversion gain signal HCG (data_hcg) as the combined signal (combined data) data_dhdr (process PR13).

When judging in the process PR12 that the level of the high conversion gain signal HCG (data_hcg) is larger than the threshold value (J_Thresh+step2), the combinational processing part 714 compares the threshold value (J_Thresh+step1) of the high gain side join position jp1 and the high conversion gain signal HCG (data_hcg) (process PR14) and judges whether the level of the high conversion gain signal HCG (data_hcg) is smaller than the threshold value (J_Thresh+step1) (process PR15).

When judging in the process PR15 that the level of the high conversion gain signal HCG (data_hcg) is smaller than the threshold value (J_Thresh+step1), the combinational processing part 714 performs the following processing (processes PR16, ER17). The combinational processing part 714 calculates the average weighting value AVW01 of the high conversion gain signal HCG and low conversion gain signal LCG by the following equation according to the weighting valises WV01 assigned to the area A01 sandwiched between the threshold value (J_Thresh+step2) of the high gain side join position jp0 and the threshold value (J_Thresh+step1) of the adjacent high gain side join position jp1 (LCG:HCG=1:3) (process PR16) and applies the average weighting value AVW01 as the combined signal (combined data) data_dhdr of that area (process PR17).

$$AVW01 = (\text{data\_hcg} \times 3 + \text{data\_lcg})/4 \quad \text{(Equation 4)}$$

When judging in the process PR15 that the level of the high conversion gain signal HCG (data_hcg) is larger than the threshold value (J_Thresh+step1), the combinational processing part 714 compares the threshold value (J_Thresh+step1) of the low gain side join position jp2 and the high conversion gain signal HCG (data_hcg) (process PR18) and judges whether the level of the high conversion gain signal HCG (data_hcg) is smaller than the threshold value (J_Thresh+step1) (process PR19).

When judging in the process PR13 that the level of the high conversion gain signal HCG (data_hcg) is smaller than the threshold value (J_Thresh+step1), the combinational processing part 714 performs the following processing (processes PR20, PR21). The combinational processing part 714 calculates the average weighting value AVW12 of the high conversion gain signal HCG and low conversion gain signal LCG by the following equation according to the weighting value WV12 assigned to the area A12 sandwiched between the threshold value (J_Thresh+step1) of the high gain side join position jp1 and the threshold value (J_Thresh+step1) of the adjacent low gain side join position jp2 (LCG:HCG=1:1) (process PR20) and applies the average weighting value AW12 as the combined signal (combined data) data_dhdr of that area (process PR21).

$$AVW12 = (\text{data\_hcg} + \text{data\_lcg})/2 \quad \text{(Equation 5)}$$

When judging in the process PR13 that the level of the high conversion gain signal HCG (data_hcg) is larger than the threshold value (J_Thresh+step1), the combinational processing part 714 compares the threshold value (J_Thresh+step2) of the low gain signal endmost part side join position jp3 and the high conversion gain signal HCG (data_hcg) process PR22) and judges whether the level of the high conversion gain signal HCG (data_hcg) is smaller than the threshold value (J_Thresh+step2) (process PR23).

When judging in the process PR23 that the level of the high conversion gain signal HCG (data_hcg) is smaller than the threshold value (J_Thresh+step2), the combinational processing part 714 performs the following processing (processes PR24, PR25). The combinational processing part 714 calculates the average weighting value AVW23 of the high conversion gain signal HCG and low conversion gain signal LCG by the following equation according to the weighting value WV23 assigned to the area A23 sandwiched between the threshold value (J_Thresh+step1) of the low gain side join position jp2 and the threshold value (J_Thresh+step2) of the adjacent low gain side join position jp3 (LCG: HCG=3:1) (process PR24) and applies the average weighting value AVW23 as the combined signal (combined data) data_dhdr of that area (process PR25).

$$AVW23=(data\_hcg+data\_lcg\times 3)/4 \qquad \text{(Equation 6)}$$

When judging in the process PB23 that the level of the high conversion gain signal HCG (data_hcg) is not smaller, but larger than the threshold value (J_Thresh+step2) (process PR26), the combinational processing part 714 applies the low conversion gain signal LCG (data_lcg) as the combined signal (combined data) data_dhdr (process PR27).

As explained above, the signal processing part 710 in the solid-state imaging device 10 of the first embodiment is configured to combine a plurality of read-out signals, for example, a high conversion gain signal HCG and low conversion gain signal LCG, to extend the dynamic range. The signal processing part 710 makes the inclinations of the plurality of read-out signals to be combined, for example the low conversion gain signal LCG and the high conversion gain signal HCG, equal. When combining the plurality of read-out signals, the signal processing part 710 selects at least one signal which becomes necessary for the combinational operation in accordance with a result of a comparison between at least one read-out signal among the plurality of read-out signals (high conversion gain signal HCG and low conversion gain signal LCG) and a threshold value (Joint Thresh), applies the selected signal to the combinational processing, and generates a combined signal extended in dynamic range.

Further, when combining the read-out signals from one specific pixel, the signal processing part 710 determines the combinational information concerning the combinational operation of the read-out signals with reference to the combinational information concerning the combinational operation of the surrounding pixels of the one pixel. The signal processing part 710, for example, as the combinational information of the surrounding pixels of the specific pixel, refers to the combinational information of the pixels forming the smallest unit UNT of the predetermined color arrangement (Bayer array in the present example) (information indicating whether a signal is a high conversion gain signal HCG or low conversion gain signal LCG in the present example).

Accordingly, according to the first embodiment, when combining (assembling) a plurality of read-out signals, for example, a high conversion gain signal HCG and low conversion gain signal LCG, to improve the dynamic range, it becomes possible to alleviate the problems due to the deterioration of the precision of the linearity occurring in combinational processing. In particular, it becomes possible to suppress the false color generated due to the change of correlation with the surrounding pixels (pixels in the surroundings) due to the change of the color temperature and improve the quality of the image. That is, according to the first embodiment, smooth switching of the plurality of signals to be combined is possible irrespective of individual variations etc., a higher dynamic range can be realized while suppressing the generation of false color or other deterioration of the images, and consequently it becomes possible to realize a higher quality of image.

Further, the signal processing part 710 in the first embodiment is configured so that it can dynamically change the threshold value. It applies, as the threshold values, to the combinational processing a reference threshold value (center threshold value) J_Thresh which is set in advance and a new threshold values (J_Thresh±stepα) determined by a comparison operation (for example addition or subtraction) of the reference threshold value J_Thresh and a predetermined step value stepα (α is a natural number)

Accordingly, according to the first embodiment, even in a case where there is variation in individual units of the solid-state imaging devices or variation between pixels in one unit, smooth switching of the plurality of signals to be assembled together (to be combined) is possible and discontinuous points can be reduced, so consequently noise can be reduced, therefore it becomes possible to generate a high quality and high dynamic image signal with a little noise. Further, it becomes possible to absorb the individual variations, therefore it becomes possible to improve the yield of products.

That is, according to the first embodiment, smooth switching of the plurality of signals to be combined is possible irrespective of individual variations etc., a higher dynamic range can be realized while suppressing deterioration of the image, and consequently it becomes possible to realize a higher quality of image.

Further, the signal processing part 710 in the first embodiment, for example, has the combinational processing part 714 including a function as a weighting processing part for performing weighting processing of the plurality of read-out signals to be combined (high conversion gain signal HCG and low conversion gain signal LCG) in accordance with the results of a comparison between the read-out signal used as a reference among the plurality of read-out signals (for example high conversion gain signal HCG) and the corresponding threshold value (J_Thresh, J_Thresh±stepα). At the signal level of the area sandwiched by the threshold values, the combinational processing part 714 including the weighting processing part calculates the average weighting value according to the weighting value assigned to this area and outputs the average weighting value as the combined signal of that area. Further, the weighting processing part is configured including an average processing function of averaging the plurality of read-out signals. The average processing function is for converting the value obtained by averaging the signals at the signal level of the area sandwiched by the threshold values to a single output.

Accordingly, according to the first embodiment, smoother switching of the plurality of signals to be assembled together (to be combined) is possible and discontinuous points can be reliably reduced, so consequently noise can be reduced. Further, it becomes possible to generate a high quality and high dynamic image signal with little noise.

Second Embodiment

Figure 16:
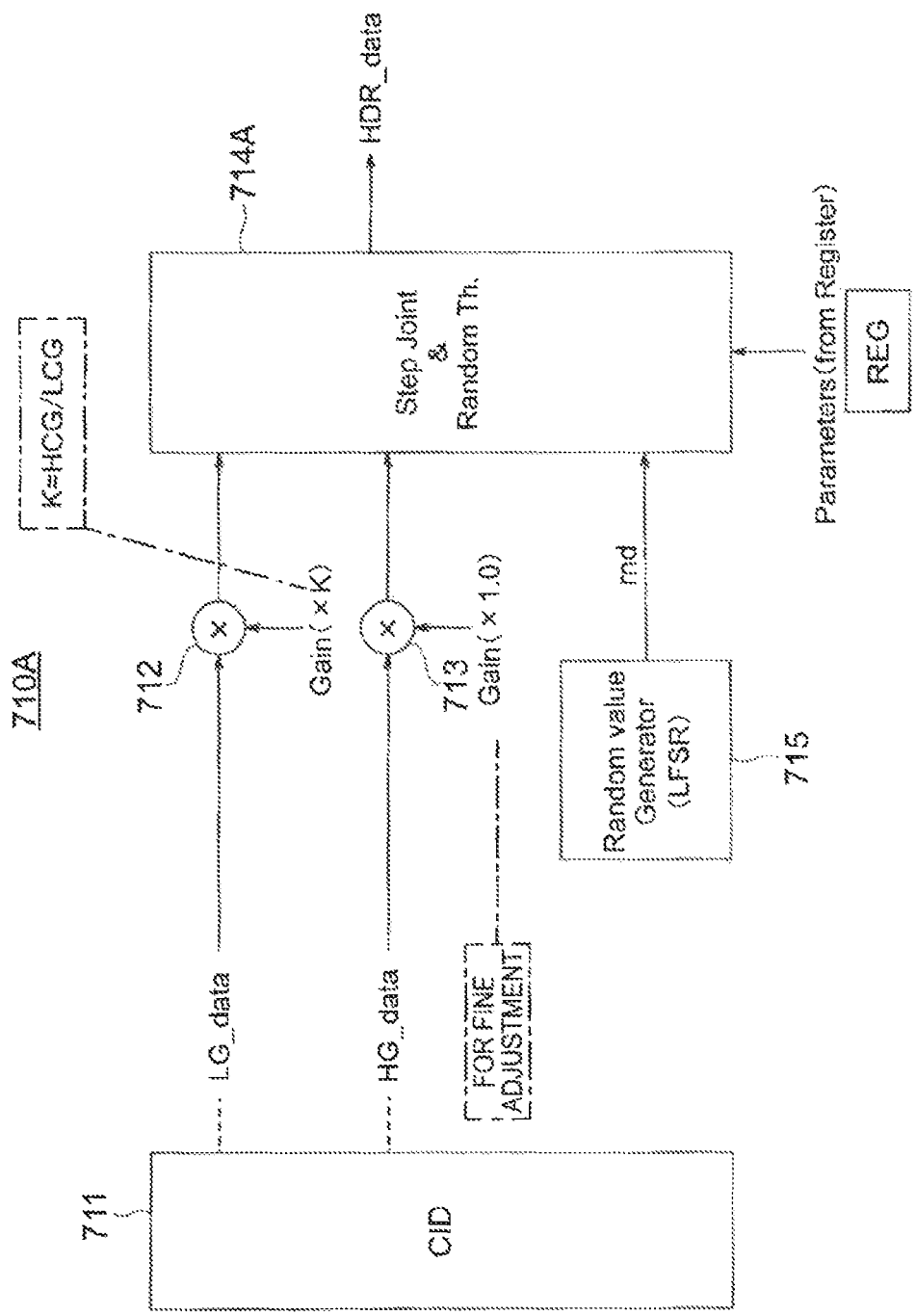
FIG. 16 is a view showing an example of the configuration of a signal processing part according to a second embodiment of the present invention.
Figure 17:
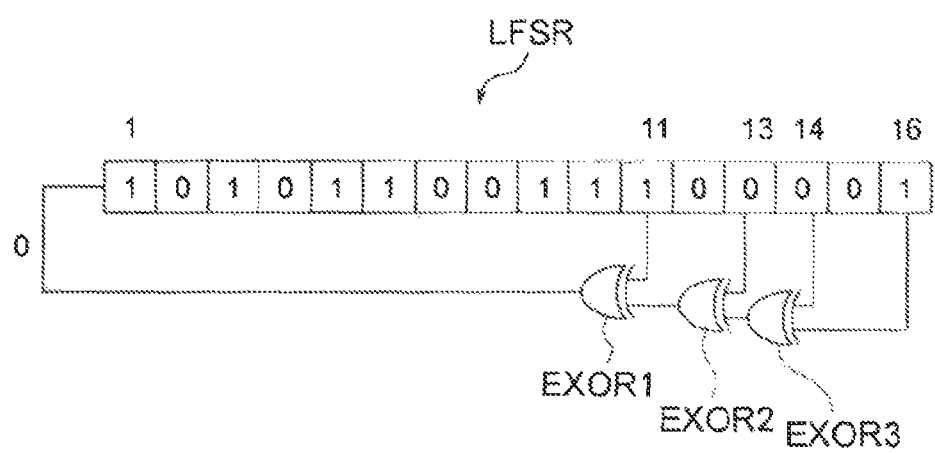
FIG. 17 is a view showing an example of the concrete configuration, of a random number generating part in FIG. 16.

FIG. 16 is a view showing an example of a configuration of a signal processing part according to a second embodiment of the present invention. FIG. 17 is a view showing an example of a concrete configuration of a random number generating part in FIG. 16.

A difference of a signal processing part 710A in FIG. 16 according to the second embodiment from the signal processing part 710 in FIG. 7 according to the first embodiment resides in that a random number generating part 715 is provided and the combinational processing part 714A performs addition or subtraction of random numbers rnd (clk)

with respect to the threshold value J_Thresh to set the threshold value. Here, clk is the same frequency as the transfer clock of the pixel data, and the random number changes in units of pixels.

The combinational processing part 714A can set for example the mean value of the plurality of threshold values as the center threshold value corresponding to the reference threshold value J_Thresh. As a center threshold value, it makes the value which is newly calculated by adding a random number rnd (clk) generated in the random number generating part 715 to the center threshold value J_Thresh in an initial stage as the second center threshold value (J_Thresh+rnd (clk)) and performs the selection processing of the signal which becomes necessary for the composition based on the second center threshold value (J_Thresh+rnd (clk)).

The random number generating part 715, for example as shown in FIG. 17, is formed by a linear feedback shift register LFSR including exclusive OR gates EXOR1 to EXOR3. FIG. 17 is shown as an example of a case of 16 bits.

In combining two signals corresponding to Equation 3 in the first embodiment in the combinational processing part 714A in the second embodiment, the processing is carried out under the following set conditions:

if (data_hcg<(j_thresh+rnd (clk)−step2))
  data_dhdr=data_hcg;

if (data_hcg<(j_thresh+rnd (clk)−step1)) data_dhdr=
  (data_hcg×3+data_lcg)/4;

if (data_hcg<(j_thresh+rnd (clk)+step1)) data_dhdr=
  (data_hcg+data_lcg)/2;

if (data_hcg<(j_thresh+rnd (clk)+step2)) data_dhdr=
  (data_hcg+data_lcg×3)/4;

if (data_hcg>(j_thresh+rnd (clk)+step2))
  data_dhdr=data_lcg;                    (Equation 7)

That is, in this processing, the same processing as the processing in Equation 3 and FIG. 15 described above is carried out except that the value newly calculated by adding the random number rnd(clk) generated in the random number generating part 715 to the center threshold value J_Thresh in the initial stage is applied as the second center threshold value (J_Thresh+rnd(clk)). Accordingly, here, a detailed explanation is omitted.

According to the second embodiment, the same effects as those in the first embodiment explained above can be obtained. That is, according to the second embodiment, even in a case where there is variation in individual units of the solid-state imaging devices or variation between pixels in one unit, smooth switching of the plurality of signals to be assembled together (to be combined) is possible and discontinuous points can be reduced, so consequently noise can be reduced, therefore it becomes possible to generate a high quality and high dynamic image signal with a little noise. Further, it becomes possible to absorb the individual variations, therefore it becomes possible to improve the yield of products. Further, according to the second embodiment, when combining (assembling) a plurality of read-out signals, for example, a high conversion gain signal HCG and low conversion gain signal LCG, to improve the dynamic range, it becomes possible to alleviate the problems due to the deterioration of the precision of the linearity occurring in in combinational processing. In particular, it becomes possible to suppress the false color generated due to the change of correlation with the surrounding pixels (pixels in the surroundings) due to the change of toe color temperature and improve the quality of the image.

APPLICATION EXAMPLE

In the embodiments explained above, as an example of the plurality of read-out signals, the case where the two signals of the high conversion gain signal HCG and low conversion gain signal LCG were combined to extend the dynamic range was explained. However, it is also possible to apply the present invention to a case where three or four or more signals having different characteristics are combined while making their inclinations equal.

Figure 18:
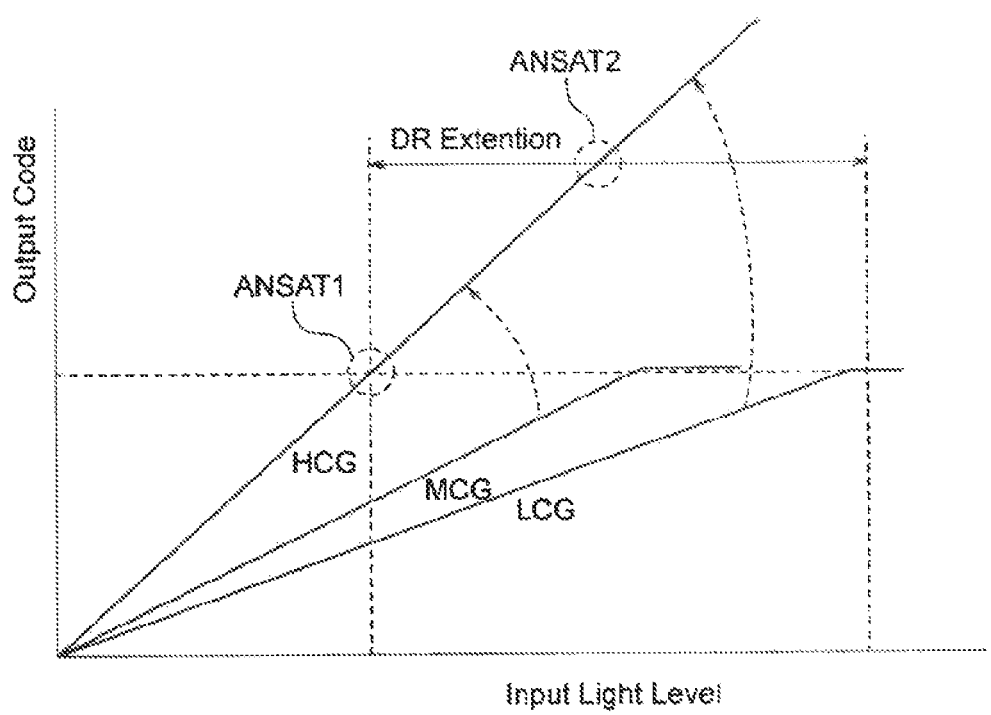
FIG. 18 is a view for explaining processing of containing three signals of a high conversion gain signal, a middle gain signal, and a low conversion gain signal while making their inclinations equal.

FIG. 18 is a view for explaining processing for combining three signals of a high conversion gain signal HCG, middle conversion gain signal MCG, and low conversion gain signal LCG while making their inclinations equal.

In the example in FIG. 18, the middle conversion gain signal MCG which is intermediate between the high gain and the low gain is added to the coverage of combination.

In this case, in the non-saturated area ANSAT1 before saturation of the high conversion gain signal HCG and in which linearity is maintained, the middle conversion gain signal MCG and the high conversion gain signal HCG are smoothly combined stepwise according to the sans processing as the combinational processing in the embodiments explained before. The gain ratio for adjusting the inclinations at this tine is HCG/MCG. In the combinational processing in the non-saturated area ANSAT1, the middle conversion gain signal MCG is handled as the same signal as the low conversion gain signal in the combinational processing in the embodiments.

In the same way, in a non-saturated area ANSAT2 which is before saturation of the middle conversions gain signal MCG and in which linearity is maintained, according to the same processing as the combinational processing in the embodiments explained before, the middle conversion gain signal MCG and the low conversion gain signal LCG are smoothly combined stepwisely. The gain ratio for adjusting the inclinations at this time is MCG/LCG. In the combinational processing in the non-saturated area ANSAT2, the middle conversion gain signal MCG is handled as the same signal as the high conversion gain signal in the combinational processing in the embodiments.

In this case as well, the same effects as those in the first and second embodiments explained above can be obtained.

Modification

Figure 19:
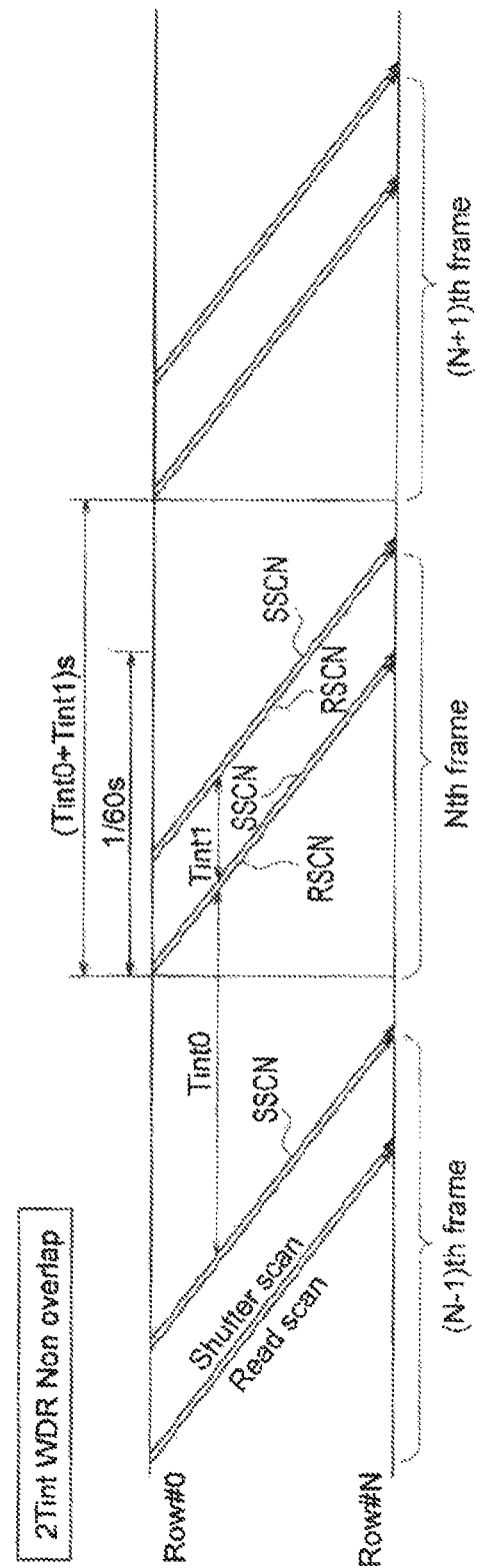
FIG. 19 is a view showing an example of a technique for raising the dynamic range dividing exposure into two or more steps of image capture corresponding to a high luminance side by a short exposure time and image capture corresponding to a low luminance by a long exposure time.

FIG. 19 is a diagram showing an example of a technique for raising the dynamic range by dividing the exposure to two steps or more of image capture corresponding to a high luminance side by a short exposure time and image capture corresponding to a low luminance by a long exposure time.

In the embodiments explained above, the explanation was given by taking as an example the case of a configuration in which two systems of the selection transistors SEL-Tr and source follower transistors SF-Tr were provided in the configuration itself of the pixel PXL so that the plurality of read-out signals of the two signals of the high conversion gain signal HCG and low conversion gain signal LCG were generated, but the present invention is not limited to such a configuration. For example, it is also possible to provide only one system of a selection transistor SEL-Tr and source follower transistor SF-Tr in the configuration itself of the pixel PXL and, as shown in FIG. 19, employ a technique of raising the dynamic range by dividing exposure into two or more steps of image capture corresponding to a high luminance side by a start exposure time and image capture corresponding to a low luminance by a long exposure time.

In the readout operation of the pixels, under the control of the timing controller etc., as shown in FIG. 19, a shutter scan SSCN is carried out, then a read scan RSCN is carried out. However, in the example in FIG. 19, two exposure periods Tint0 and Tint1 from when the shutter scan SSCN is carried out to when the read scan RSCN is then carried but are provided, thereby imparting a time difference.

In this case as well, the same effects as those in the first and second embodiments explained above can be obtained.

Figure 20:
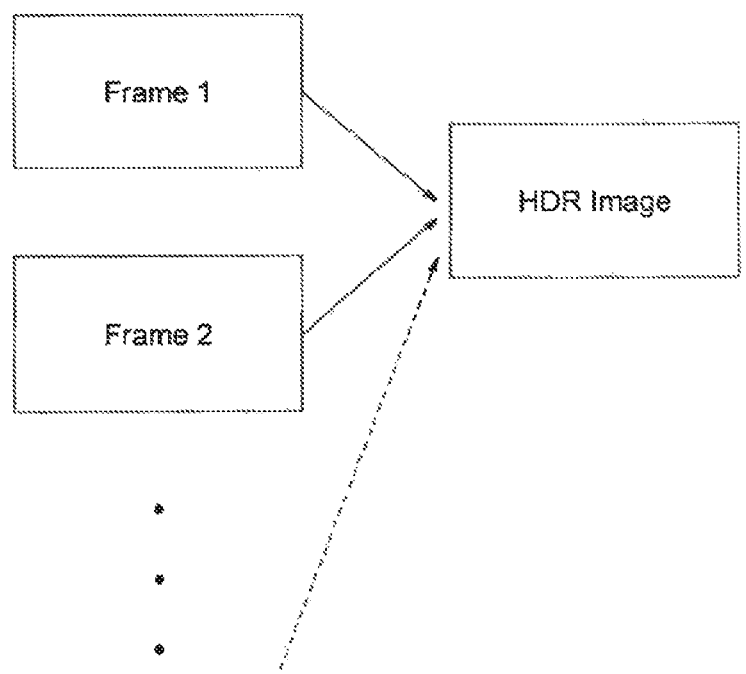
FIG. 20 is a view for explaining an example of raising a dynamic range in units of frames.

FIG. 20 is a view for explaining an example of raising the dynamic range in units of frames. Further, in the embodiments explained above, the explanation was given of the example of raising the dynamic range in units of pixels. However, the present invention can also be applied to the case of raising the dynamic range in units of frames as shown in FIG. 20.

In this case as well, the same effects as those in the first and second embodiments explained above can be obtained.

The solid-state imaging device 10 explained above can be applied as an imaging device to a digital camera, video camera, portable terminal, or monitoring camera, camera for a medical endoscope, or other electronic apparatuses.

Figure 21:
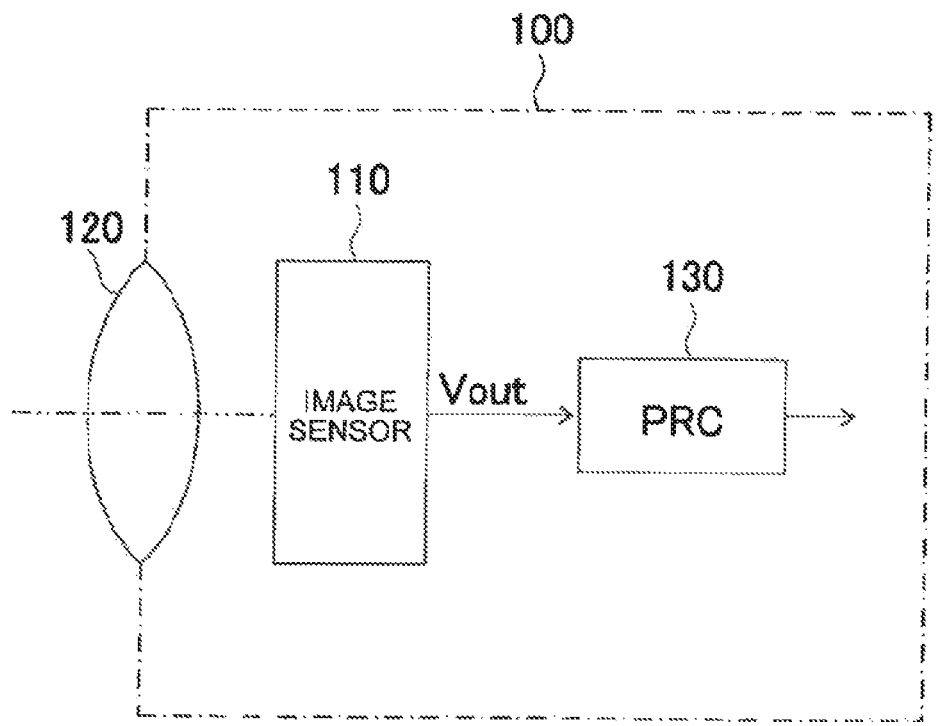
FIG. 21 is a view showing an example of the configuration of an electronic apparatus to which a solid-state imaging device according to an embodiment of the present invention is applied.

FIG. 21 is a view showing an example of the configuration of an electronic apparatus mounting a camera system to which the solid-state imaging device according to an embodiment of the present invention is applied.

The electronic apparatus 100, as shown in FIG. 21, has a CMOS image sensor 110 to which the solid-state imaging device 10 according to an embodiment can be applied. Further, the electronic apparatus 100 has an optical system (lens etc.) 120 which guides incident light (forms a subject image) into a pixel region of this CMOS image sensor 110. The electronic apparatus 100 has a signal processing circuit (PRC) 130 for processing the output signals of the CMOS image sensor 110.

The signal processing circuit 130 applies predetermined signal processing with respect to the output signals of the CMOS image sensor 110. The image signal processed in the signal processing circuit 130 can be projected as a moving image onto a monitor formed by a liquid crystal display or the like or can be output to a printer. Further, it can be directly recorded in a storage medium such as a memory card. Various embodiments are possible.

As explained above, by mounting the solid-state imaging device 10 explained before as the CMOS image sensor 110, it becomes possible to provide a high performance, small-sized, and low cost camera system. Further, it is possible to realize for example a monitoring camera or camera for a medical endoscope or other electronic apparatus which is used for applications where there are restrictions in mounting size, number of connectable cables, cable length, installation height, etc. in requirements for camera installation.

The invention claimed is:

1. A solid-state imaging device for extending a dynamic range by combining a plurality of read-out signals, comprising:
a signal processing part which, when combining specific read-out signals among the plurality of read-out signals, selects at least one signal for a combinational operation in accordance with a result of a comparison between at least one read-out signal among the plurality of read-out signals and a threshold value, applies a selected signal to the combinational operation, and generates a combined signal extended in the dynamic range, wherein
the signal processing part, when combining the plurality of read-out signals from one specific pixel, determines a combinational information concerning the combinational operation of the plurality of read-out signals with reference to the combinational information concerning the combinational operation of surrounding pixels of the one specific pixel, wherein
the signal processing part, as the combinational information of the surrounding pixels of the one specific pixel, refers to the combinational information of pixels forming a smallest unit of a predetermined color arrangement, and wherein the signal processing part
uses a plurality of methods of determination of the combinational information of the plurality of read-out signals, and
selects one method among the plurality of methods of determination of the combinational information by judging it by a number of times the methods of determination of the combinational information are applied for the surrounding pixels.

2. A solid-state imaging device for extending a dynamic range by combining a plurality of read-out signals, comprising:
a signal processing part which, when combining specific read-out signals among the plurality of read-out signals, selects at least one signal for a combinational operation in accordance with a result of a comparison between at least one read-out signal among the plurality of read-out signals and a threshold value, applies a selected signal to the combinational operation, and generates a combined signal extended in the dynamic range, wherein
the signal processing part, when combining the plurality of read-out signals from one specific pixel, determines a combinational information concerning the combinational operation of the plurality of read-out signals with reference to the combinational information concerning the combinational operation of surrounding pixels of the one specific pixel, wherein
the signal processing part, as the combinational information of the surrounding pixels of the one specific pixel, refers to the combinational information of a pixel having a same color as this pixel, and wherein the signal processing part
uses a plurality of methods of determination of the combinational information of the plurality of read-out signals, and
selects one method among the plurality of methods of determination of the combinational information by comparing the combinational information of the one specific pixel and the combinational information of the surrounding pixels having the same color as a filter color of the one specific pixel.

3. The solid-state imaging device according to claim 1, wherein when selecting the one method of determination of the combinational information, the signal processing part refers to a level of a luminance signal generated from each of colored pixels.

4. The solid-state imaging device according to claim 1, wherein when selecting the one method of determination of the combinational information, the signal processing part refers to a calculated color temperature.

5. The solid-state imaging device according to claim 2, wherein the signal processing part determines the method of determination of the combinational information based on change along with time of the plurality of read-out signals from each of the pixels which are referred to.

6. A solid-state imaging device for extending a dynamic range by combining a plurality of read-out signals, comprising:
a signal processing part which, when combining specific read-out signals among the plurality of read-out signals, selects at least one signal for a combinational operation in accordance with a result of a comparison between at least one read-out signal among the plurality of read-out signals and a threshold value, applies a selected signal to the combinational operation, and generates a combined signal extended in the dynamic range, wherein
the signal processing part, when combining the plurality of read-out signals from one specific pixel, determines a combinational information concerning the combinational operation of the plurality of read-out signals with reference to the combinational information concerning the combinational operation of surrounding pixels of the one specific pixel, wherein
the signal processing part has a function of dividing an interior of one screen into a plurality of regions and restricting a method of determination of the combinational information to be selected in units of those divided regions.

7. The solid-state imaging device according to claim 1, having a plurality of signal processing parts.

8. A solid-state imaging device for extending a dynamic range by combining a plurality of read-out signals, comprising:
a signal processing part which, when combining specific read-out signals among the plurality of read-out signals, selects at least one signal for a combinational operation in accordance with a result of a comparison between at least one read-out signal among the plurality of read-out signals and a threshold value, applies a selected signal to the combinational operation, and generates a combined signal extended in the dynamic range, wherein
the signal processing part, when combining the plurality of read-out signals from one specific pixel, determines a combinational information concerning the combinational operation of the plurality of read-out signals with reference to the combinational information concerning the combinational operation of surrounding pixels of the one specific pixel, wherein the signal processing part dynamically changes the threshold value, and wherein:
the signal processing part applies to the combinational processing, as the threshold value,
a reference threshold value which is set in advance, and
a new threshold value determined by comparison processing of the reference threshold value and a predetermined step value.

9. A solid-state imaging device for extending a dynamic range by combining a plurality of read-out signals, comprising:
a signal processing part which, when combining specific read-out signals among the plurality of read-out signals, selects at least one signal for a combinational operation in accordance with a result of a comparison between at least one read-out signal among the plurality of read-out signals and a threshold value, applies a selected signal to the combinational operation, and generates a combined signal extended in the dynamic range, wherein
the signal processing part, when combining the plurality of read-out signals from one specific pixel, determines a combinational information concerning the combinational operation of the plurality of read-out signals with reference to the combinational information concerning the combinational operation of surrounding pixels of the one specific pixel, wherein the signal processing part dynamically changes the threshold value, and wherein:
the signal processing part
includes a weighting processing part for weighting the plurality of read-out signals, and
has a new threshold value for weighting, and
the weighting processing part, at a signal level of an area sandwiched by the threshold values, calculates an average weighting value according to the weighting value assigned to this area and outputs the average weighting value as the combined signal of the area.

10. The solid-state imaging device according to claim 9, wherein:
provision is made of a plurality of threshold values,
the weighting processing part includes an averaging processing function of averaging the plurality of read-out signals, and
the averaging processing function uses an averaged value of the signals at the signal level of the area sandwiched by the threshold values as one output.

11. The solid-state imaging device according to claim 8, wherein:
the signal processing part
includes a random number generating part,
sets a mean value of a plurality of threshold values as a center threshold value corresponding to the reference threshold value,
as the center threshold value, determines a value, which is newly calculated by adding a random number generated in the random number generating part to the center threshold value in an initial stage as a second center threshold value, and
performs selection processing of a signal which becomes necessary for the combinational operation based on the second center threshold value.

12. A method for driving a solid-state imaging device capable of for extending a dynamic range by combining a plurality of read-out signals, comprising:
a comparison process of, when combining specific read-out signals among the plurality of read-out signals, comparing at least one read-out signal among the plurality of read-out signals and a threshold value,
a selection process of selecting at least one signal which becomes necessary for a combinational operation in accordance with a result of a comparison, and
a generation process of applying a signal to the combinational operation and generating a combined signal extended in dynamic range, wherein
when combining the plurality of read-out signals from one specific pixel, a combinational information concerning the combinational operation of these read-out signals is determined with reference to the combinational information concerning the combinational operation of surrounding pixels of the one specific pixel, wherein
as the combinational information of the surrounding pixels of the one specific pixel, the combinational information of pixels forming a smallest unit of a predetermined color arrangement is referred to, and wherein
plurality of methods of determination of the combinational information of the plurality of read-out signals are used, and one method among the plurality of methods of determination of the combinational information is selected by judging it by a number of times the methods of determination of the combinational information are applied for the surrounding pixels.

13. An electronic apparatus, comprising,
a solid-state imaging device for extending a dynamic range by combining a plurality of read-out signals; and
an optical system for forming a subject image in the solid-state imaging device, wherein
the solid-state imaging device includes a signal processing part which, when combining specific read-out signals among the plurality of read-out signals, selects at least one signal for a combinational operation in accordance with a result of a comparison between at least one read-out signal among the plurality of read-out signals and a threshold value, applies a signal to the combinational operation, and generates a combined signal extended in dynamic range, and wherein
the signal processing part, when combining the plurality of read-out signals from one specific pixel, determines a combinational information concerning the combinational operation of these read-out signals with reference to the combinational information concerning the combinational operation of surrounding pixels of the one specific pixel, wherein
the signal processing part, as the combinational information of the surrounding pixels of the one specific pixel, refers to the combinational information of pixels forming a smallest unit of a predetermined color arrangement, and wherein the signal processing part
uses a plurality of methods of determination of the combinational information of the plurality of read-out signals, and
selects one method among the plurality of methods of determination of the combinational information by judging it by a number of times the methods of determination of the combinational information are applied for the surrounding pixels.

* * * * *